United States Patent
Lee et al.

(10) Patent No.: US 9,973,886 B2
(45) Date of Patent: May 15, 2018

(54) WIRELESS DEVICE SEARCHING APPARATUS AND METHOD IN WIRELESS COMMUNICATION SYSTEM

(71) Applicant: Samsung Electronics Co., Ltd., Suwon-si, Gyeonggi-do (KR)

(72) Inventors: Seok-Yong Lee, Seoul (KR); Sang-Hyun Chang, Seoul (KR); Ohyun Jo, Seoul (KR); Sung-Rok Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 14/915,069

(22) PCT Filed: Aug. 29, 2014

(86) PCT No.: PCT/KR2014/008065
§ 371 (c)(1),
(2) Date: Feb. 26, 2016

(87) PCT Pub. No.: WO2015/030520
PCT Pub. Date: Mar. 5, 2015

(65) Prior Publication Data
US 2016/0205501 A1    Jul. 14, 2016

(30) Foreign Application Priority Data
Aug. 30, 2013 (KR) .......................... 10-2013-0104451

(51) Int. Cl.
*H04W 24/00* (2009.01)
*H04W 4/02* (2018.01)
(Continued)

(52) U.S. Cl.
CPC ............. *H04W 4/02* (2013.01); *H04W 8/005* (2013.01); *H04W 84/18* (2013.01); *H04W 92/18* (2013.01)

(58) Field of Classification Search
CPC ....... H04W 4/02; H04W 8/005; H04W 92/18; H04W 84/18
(Continued)

(56) References Cited

U.S. PATENT DOCUMENTS 7,529,553 B2 * 5/2009 Koyanagi ............. H04W 16/18
455/226.4
8,922,433 B2 * 12/2014 Whiting ................ G01S 5/0252
342/452

(Continued)

FOREIGN PATENT DOCUMENTS

| EP | 2293531 A1 | 3/2011 |
| KR | 10-2007-0037161 A | 4/2007 |
| KR | 10-2007-0096222 A | 10/2007 |

*Primary Examiner* — Amancio Gonzalez
(74) *Attorney, Agent, or Firm* — Jefferson IP Law, LLP

(57) ABSTRACT

Exemplary embodiments of the present disclosure suggest an apparatus and method for rapidly establishing an initial connection and exchanging data among wireless devices in a wireless communication system. According to the exemplary embodiments of the present disclosure, a certain wireless device for transmitting data may discover neighboring wireless devices and display locations of the discovered wireless devices as information in the form of a map. Then, a user can easily select a wireless device to transmit data to based on the information which is displayed in the form of the map as described above, and transmit desired data to the selected wireless device.

22 Claims, 30 Drawing Sheets

(51) Int. Cl.
*H04W 8/00* (2009.01)
*H04W 84/18* (2009.01)
*H04W 92/18* (2009.01)

(58) Field of Classification Search
USPC .......................................................... 455/457
See application file for complete search history.

(56) References Cited

U.S. PATENT DOCUMENTS

| | | |
|---|---|---|
| 2006/0166682 A1 | 7/2006 | Karaoguz et al. |
| 2009/0054108 A1* | 2/2009 | Kito .................... G06F 3/04883 455/566 |
| 2010/0041334 A1* | 2/2010 | Engelsma ............. G01S 5/0072 455/41.2 |
| 2010/0087144 A1 | 4/2010 | Korenshtein |
| 2011/0081923 A1* | 4/2011 | Forutanpour ......... G06F 1/1694 455/457 |
| 2012/0130627 A1 | 5/2012 | Islam et al. |
| 2013/0042180 A1 | 2/2013 | Sai et al. |
| 2013/0143494 A1 | 6/2013 | Chen et al. |

* cited by examiner

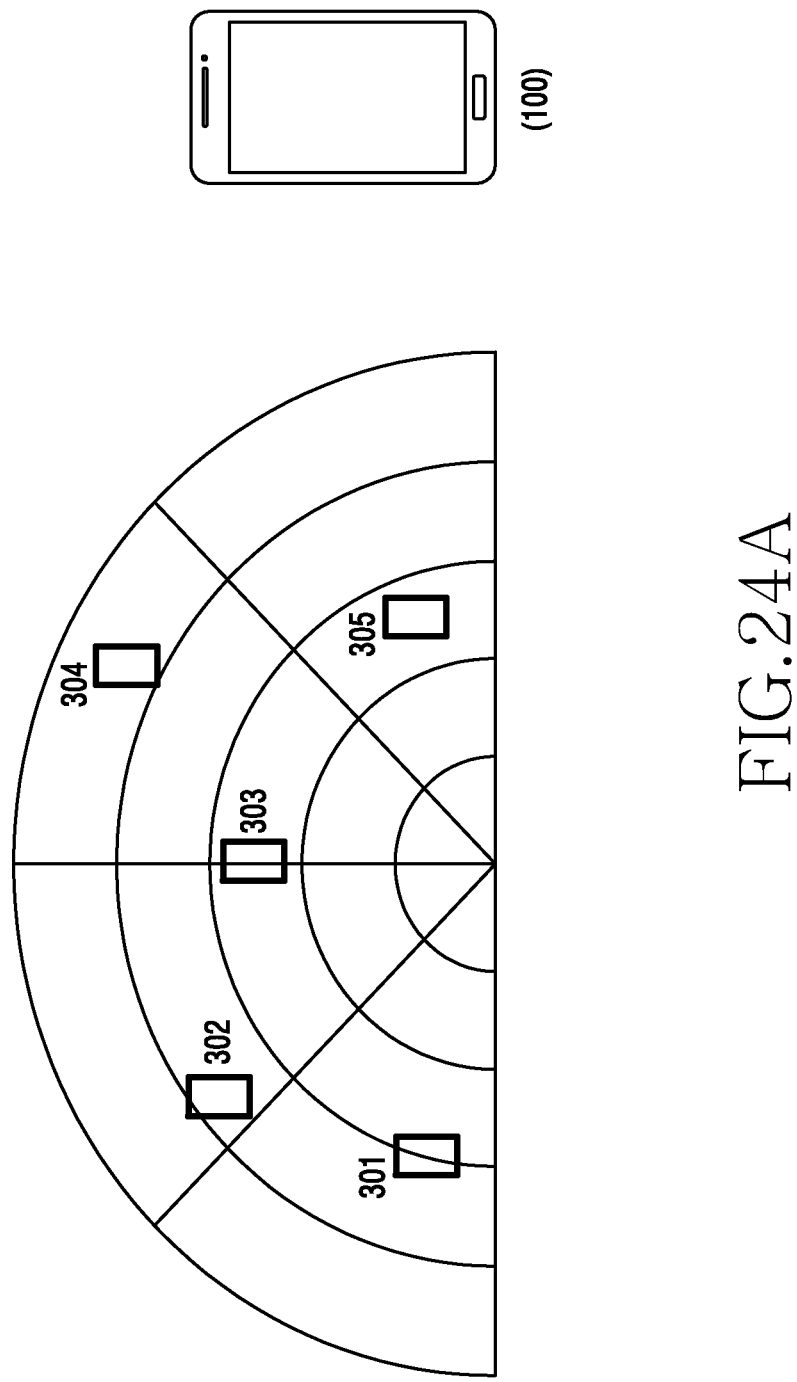

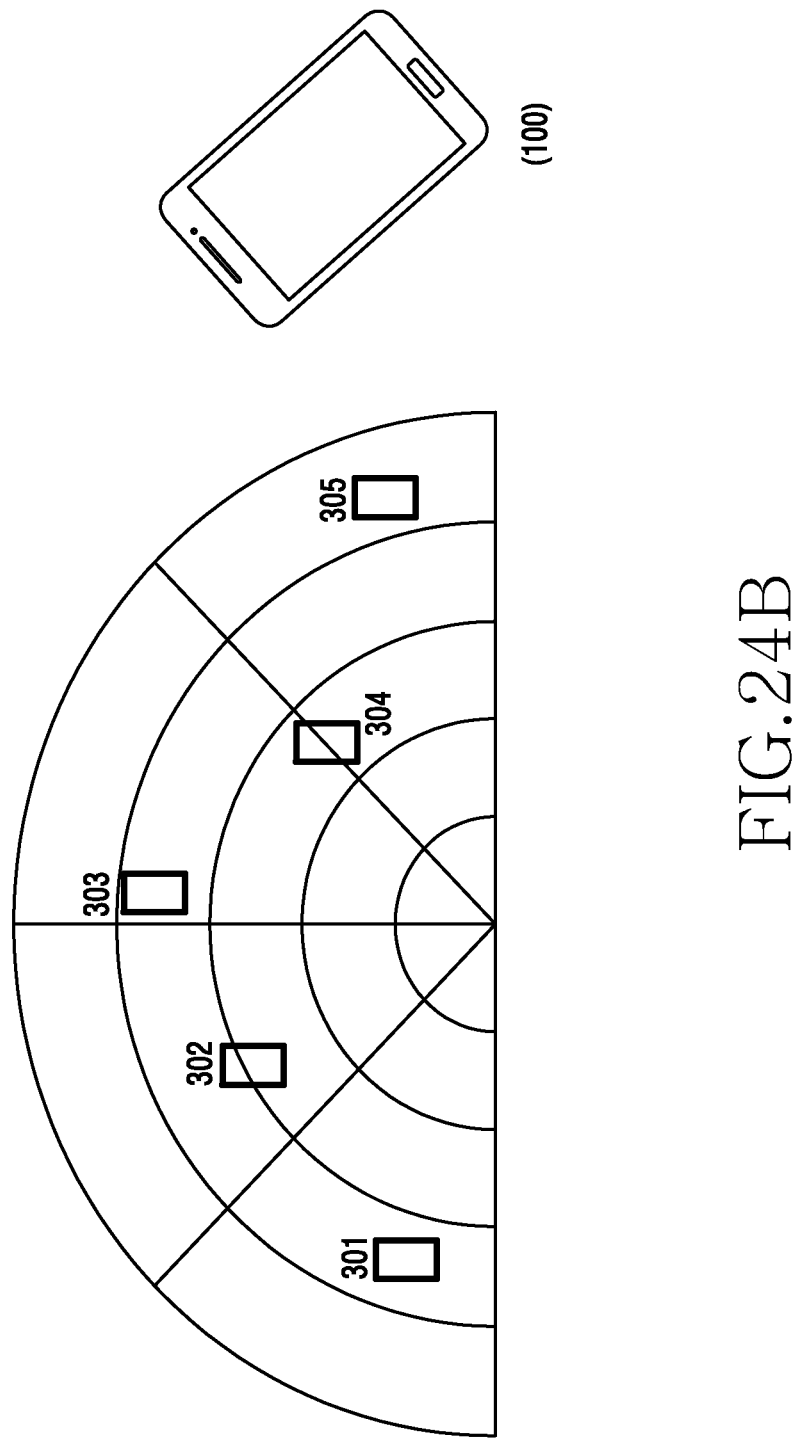

WIRELESS DEVICE SEARCHING APPARATUS AND METHOD IN WIRELESS COMMUNICATION SYSTEM

TECHNICAL FIELD

Exemplary embodiments of the present disclosure relate to transmitting data through a wireless device in a wireless communication system.

BACKGROUND ART

With the recent development of wireless communication technologies, data is increasingly exchanged through wireless devices. For example, users transmit and receive various data (for example, moving images, music, photos, documents, etc.) through wireless devices which can be accessed wirelessly, such as smart phones. The data exchanged through the wireless devices include not only data which is provided by service providers but also data which is transmitted to or received from other wireless devices. It is necessary to rapidly establish an initial connection among wireless devices to rapidly exchange data thereamong.

DISCLOSURE

Technical Problem

To address the above-discussed deficiencies, it is a primary object to provide an apparatus and method for more rapidly and easily establishing an initial connection and exchanging data among wireless devices in a wireless communication system.

Another object of the present disclosure is to provide an apparatus and method for discovering neighboring wireless devices to more rapidly establish an initial connection and exchange data among wireless devices in a wireless communication system.

Another object of the present disclosure is to provide an apparatus and method for discovering wireless devices in a wireless communication system and displaying locations of the discovered wireless devices in the form of a map.

Technical Solution

According to an aspect of the present disclosure, an apparatus for discovering for a wireless device in a wireless communication system includes: a discovering instrument configured to discover a location of at least one neighboring wireless device; and a processor configured to convert location information of the neighboring wireless device which is discovered by the discovering instrument into displayable map information.

According to another aspect of the present disclosure, a method for discovering for a wireless device in a wireless communication system includes: discovering a location of at least one neighboring wireless device; and converting location information of the neighboring wireless device which is discovered by a discovering instrument into displayable map information.

Advantageous Effects

According to exemplary embodiments of the present disclosure, a user can easily select a wireless device to transmit data to based on the information which is displayed in the form of the map, and transmit desired data to the selected wireless device.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 23A to 24C illustrate views showing examples of a basic map which is adjusted and displayed according to an exemplary embodiment of the present disclosure;

DETAILED DESCRIPTION

Figure 1:
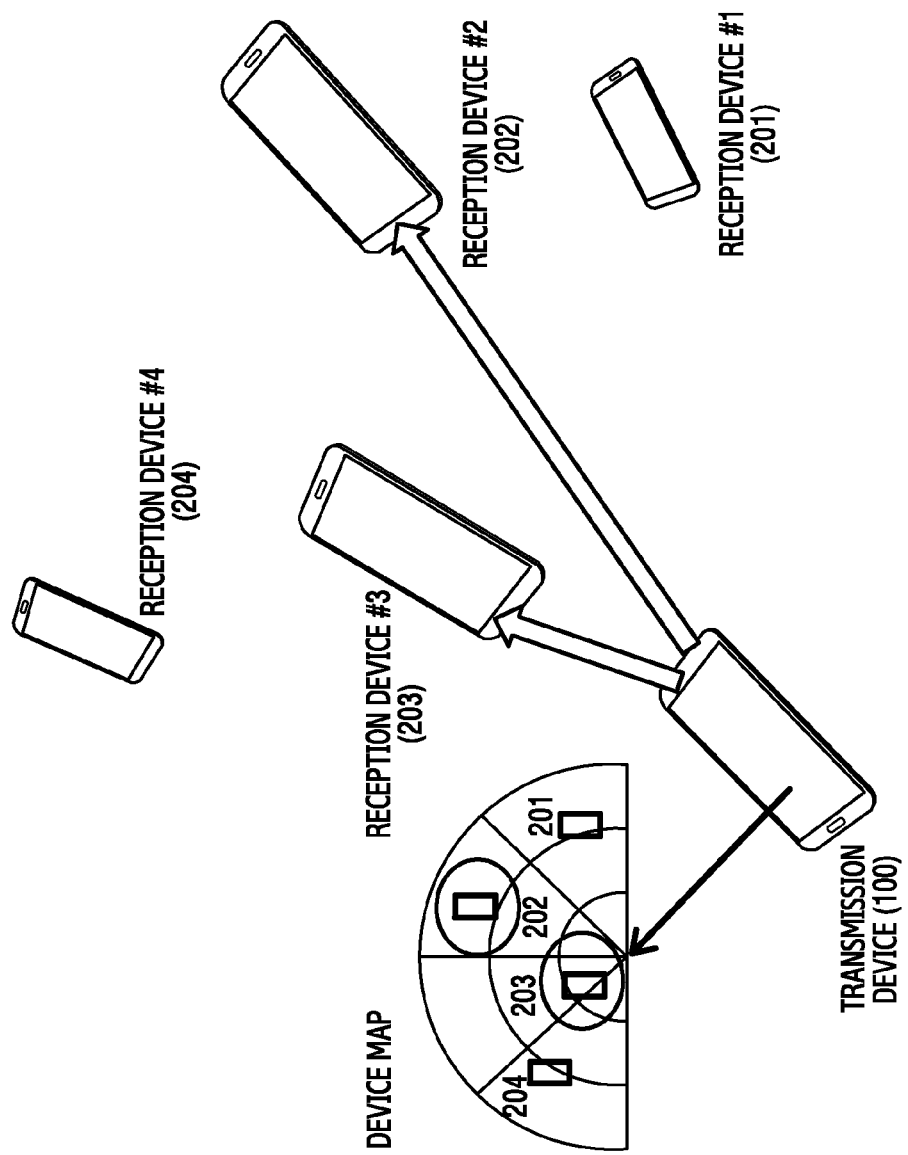
FIGS. 1 and 2 illustrate views to explain principles according to an exemplary embodiment of the present disclosure.

FIGS. 1 to 26 used to explain principles of the present disclosure in the specification of the present application are merely examples, and should not be interpreted as anything to limit the scope of the present disclosure. A person skilled in the art will understand that the principles of the present disclosure will be implemented in any wireless communication system appropriately arranged.

Exemplary embodiments of the present disclosure, which will be described below, suggest an apparatus and method for rapidly establishing an initial connection and exchanging data among wireless devices in a wireless communication system. According to the exemplary embodiments of the present disclosure, a certain wireless device for transmitting data may discover neighboring wireless devices and display locations of the discovered wireless devices as information in the form of a map. Then, a user can easily select a wireless device to transmit data based on the information which is displayed in the form of the map as described above, and transmit desired data to the selected wireless device.

For example, the wireless device may be a portable electronic device having a wireless accessing function like a smart phone. In another example, the wireless device may be one of a portable terminal, a mobile phone, a mobile pad, a media player, a tablet computer, a handheld computer, a wirelessly accessible camera, a smart television, or a personal digital assistant (PDA). In another example, the wireless device may be a device which combines two or more functions from among the above-mentioned devices.

According to an exemplary embodiment, the wireless communication system may be a device-to-device (D2D) network. According to another exemplary embodiment, the wireless communication system may be a wireless local area network (LAN). According to another exemplary embodiment, the wireless communication system may be a wireless network which supports a group play function among devices.

The exemplary embodiments of the present disclosure which will be described blow relate to a technical solution enabling users to establish an initial connection and exchange data among wireless devices rapidly, easily, and intuitively.

By the nature of the wireless device, the wireless device requires an additional special process to establish a connection among desired devices by reflecting users' intentions corresponding to a line connecting operation, compared to wire communication in which a connection of a line is assumed as an initial connection for communication among users. Since this process is absolutely necessary for preventing data from being transmitted to an unintended user, various additional processes for exchanging additional information to confirm users' intentions follow the above-described process. These additional processes may be preparing operations to be performed prior to actually exchanging data, and thus may consume much time. There may be various methods to solve this problem.

The process of establishing the initial connection of the wireless device may be reviewed from the perspective of an access point (AP) in a wireless LAN and from the perspective of a wireless LAN D2D.

In the case of the wireless LAN, stations (STAs) existing in an area covered by an AP initially search the AP. When one or more APs are searched, a user owning the STA should exactly know which AP the user wants (that is, the name of the AP) (Service Set Identifier (SSID)) in order to establish a correct connection. When many APs having the same SSID are searched, the user may have difficulty in determining which AP the user wants.

In the case of technology of establishing a wireless connection in a wireless LAN using an AP, it may be difficult to identify a corresponding AP, and much time may be required to establish the wireless connection according to user's experience. In addition, since a password may be required to identify a target to be connected more clearly, additional time may be required for a user input.

In the case of D2D, a specific device may operate as a so-called softAP and a connection may be established in the same method as in the wireless LAN. Out-of-Band (OOB) technology, such as noncontact short-distance wireless communication (near field communication (NFC)), may be used to solve difficulty in a procedure to connect to the softAP. In this case, information necessary for establishing the connection is exchanged through NFC, so that the procedure for identifying others can be simplified.

In the case of D2D using NFC technology, connectivity information may be transmitted through the NFC only when devices are close to one another. Since the devices are required to move to be close to one another, the user has to directly move the devices to establish a connection with an AP which is attached to a ceiling or establish a connection with a device which is far away from the devices, for example, a TV, which may cause inconvenience. In addition, when many devices are required to be connected to one another, there is inconvenience that the devices should be tagged device to device.

In the case of application technology of so-called group-play, a side which provides data to share media or files serves as a softAP, and a side which is provided with the data serves as an STA. When the device serving as the softAP prepares data to be provided, the devices serving as the STAs may establish a connection with one another by discovering the devices and through an identifying process such as entering a password. In addition, the device serving as the softAP may establish a connection with the devices serving as the STAs by tagging the devices one by one through NFC.

In the case of an application scenario in which a plurality of devices are connected with one another like group-play, the devices should know information on who owns the devices and which devices they use in advance after establishing a connection in order to transmit different data to the plurality of devices. However, since it is difficult to know this prior information, it is difficult to implement this application scenario.

Therefore, the exemplary embodiments of the present disclosure which will be described below improve the related-art method for establishing the connection among wireless devices as described above. That is, the exemplary embodiments of the present disclosure can solve problems such as user experience (UX) which cause inconvenience from the perspective of users, much time required to establish an initial connection, and difficulty in establishing a connection through OOB technology. In addition, the exemplary embodiments of the present disclosure can establish an initial connection easily and intuitively, and also can intuitively transmit data after the connection.

The exemplary embodiments of the present disclosure include wideband millimeter wave (mmWave) technology of a 60 GHz band as wireless data transmission technology, technology of discovering locations of wireless devices, that is, distance (ranging) and direction, using the wideband mmWave technology, an operation method of a protocol level for discovering locations of wireless devices, UX for transmitting intuitiveness necessary for establishing a connection to users using the operation method of a protocol and a service provided to the users based on the UX.

The mmWave technology of the 60 GHz band is one of the technologies of wirelessly exchanging data among users as Wireless Fidelity (WiFi) used in 2.4/5 GHz. Using this technology, a device can very exactly estimate locations of other devices on the two dimensions, which exist within a short distance, in establishing an initial connection among wireless devices. UX is generated for the user to establish an initial connection and select a target device to transmit data to based on the exactly estimated locations of the devices existing within the short distance. This is defined as a device map. The UX according to exemplary embodiments of the present disclosure includes an operation for starting communication of an appropriate scenario among devices to generate a corresponding map prior to drawing the device map, UX to show connection establishment to the user and show the user to which device data will be transmitted as a display, and UX to transmit a start of real data transmission and a reception intention.

Figure 2:
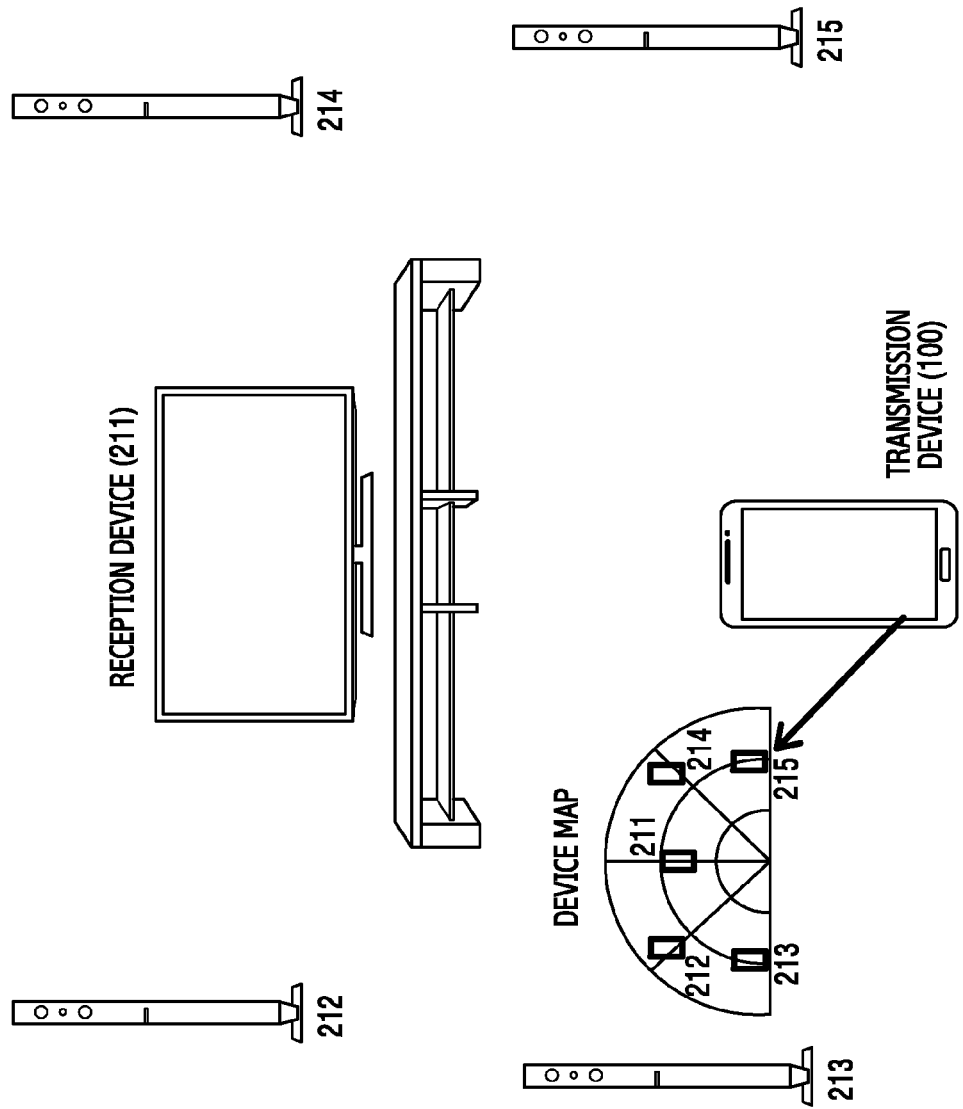

FIGS. 1 and 2 illustrate views to explain principles according to an exemplary embodiment of the present disclosure.

Referring to FIG. 1, there exist a plurality of devices (or users). When one of the plurality of users wishes to share multimedia data or file and other contents with others, the corresponding device is a transmission device 100. Users who will receive the corresponding content are reception devices 201-204.

Operations according to exemplary embodiments of the present disclosure may be performed in the following order:

First, each of the users sets the device to enter a discovery mode to share in a group. Alternatively, when each of the users performs a specific application, the device may automatically enter the discovery mode.

Next, the reception devices 201-204 may perform an operation of being oriented toward the transmission device 100.

Next, the transmission device 100 exchanges signals with the reception devices 201-204, and traces the relative locations of the reception devices 201-204 based on the exchanged signals. A protocol for exchanging signals and a basic procedure for tracing the locations based on the exchanged signals will be described in detail.

Next, the transmission device 100 performs a discovering operation until a desired number of reception devices appear or during a predetermined time, and then forwards collected information to an upper layer.

Next, the transmission device 100 may indicate that the reception devices are in the corresponding locations by drawing a device map. The device map is generated based on collected information, and indicate the relative locations of the reception devices with reference to the location and the direction of the transmission device. The device map may be a two-dimensional (2D) map or a three-dimensional (3D) map.

Next, the device map may be updated at regular intervals, thereby reflecting the result of tracing the locations of the reception devices periodically. The device map may update the relative locations of the reception devices at a corresponding time in real time according to the direction of the transmission device 100.

Next, the user may select a reception device (for example, 202, 203) to share data with on the device map. The user may select one or two or more devices.

Finally, when the users of the reception devices 202, 203 perform a UX operation to receive the data, the transmission device 100 starts transmitting the data.

Referring to FIG. 2, when the reception devices are devices which have little mobility (for example, a TV 211, speakers 212-215), the operations according to the exemplary embodiments of the present disclosure described above in relation to FIG. 1 may be performed. However, in this case, the UX operation for receiving data at the reception devices may be omitted, or may be substituted with a method appropriate to the reception devices.

Figure 3:
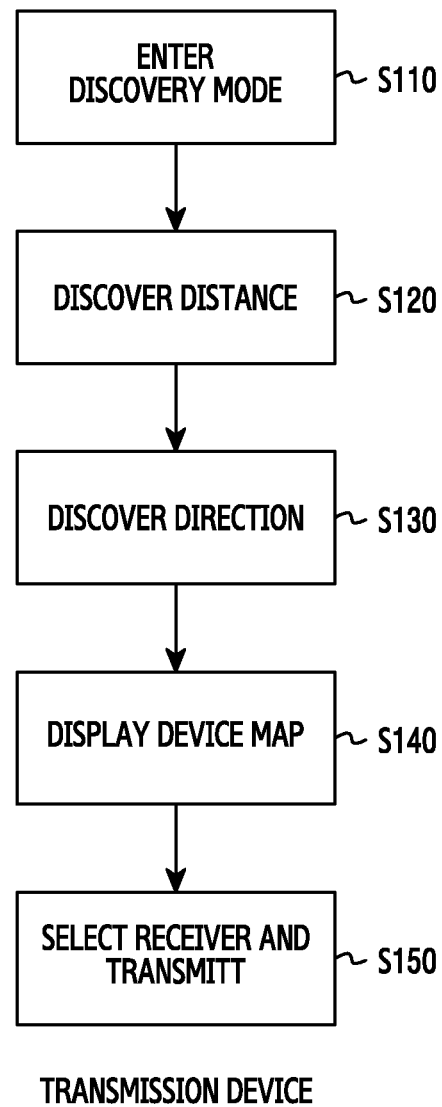
FIG. 3 illustrates a view showing an operation flow of a transmission device according to an exemplary embodiment of the present disclosure.

FIG. 3 illustrates a view showing an operation flow of a transmission device according to an exemplary embodiment of the present disclosure. For example, the transmission device may be the device 100 illustrated in FIG. 1.

Referring to FIG. 3, in step S110, the transmission device 100 enters a discovery mode. In step S120, the transmission device 100 discovers distances to neighboring devices existing within a short distance. In step S130, the transmission device 100 discovers directions of the neighboring devices existing within the short distance. In step S140, the transmission device 100 generates a device map based on the distance information and the direction information of the discovered neighboring devices, and displays the generated device map. In step S150, when a reception device to which data is transmitted is selected from the displayed device map, the transmission device 100 starts transmitting data to the selected reception device.

Figure 4:
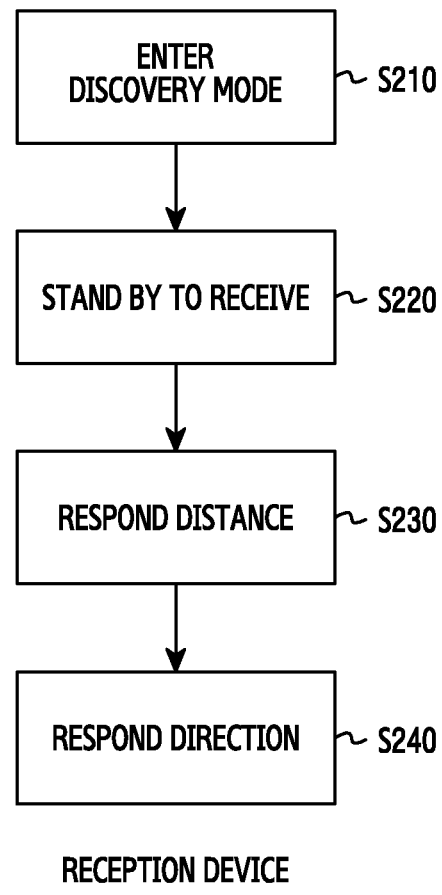
FIG. 4 illustrates a view showing an operation flow of a reception device according to an exemplary embodiment of the present disclosure.

FIG. 4 illustrates a view showing an operation flow of a reception device according to an exemplary embodiment of the present disclosure. For example, the reception device may be the device 201 illustrated in FIG. 1.

Referring to FIG. 4, in step S210, the reception device 201 enters a discovery mode. In step S220, the reception device 201 stands by to receive data. In step S230, the reception device 201 responds to a distance discovery request from the transmission device 100. In step S240, the reception device 201 responds to a direction discovery request from the transmission device 100.

FIGS. 3 and 4 explained above illustrate examples of flows of operations of exchanging information for drawing the device map between the transmission device 100 and the reception device 201. Other exemplary embodiments may be used without departing from the scope of the present disclosure. For example, the process of discovering the distance (ranging) and the process of discovering the direction may be performed in reverse order.

Figure 5:
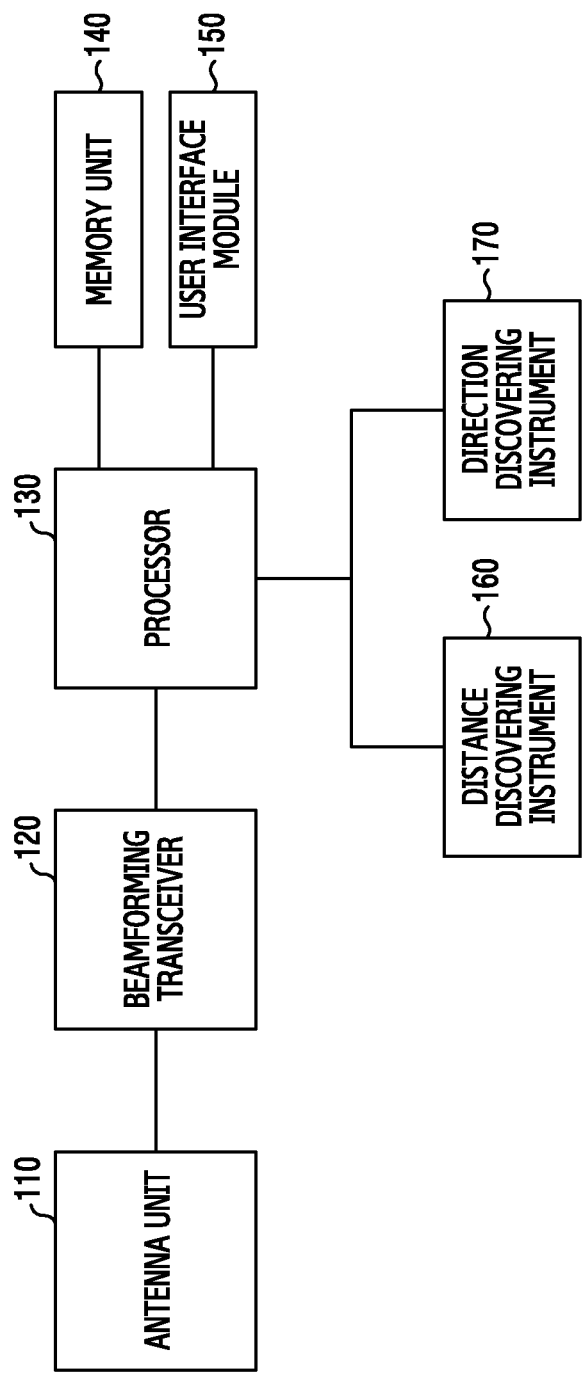
FIG. 5 illustrates a view showing a configuration of a transmission device according to an exemplary embodiment of the present disclosure.

FIG. 5 illustrates a view showing a configuration of a transmission device according to an exemplary embodiment of the present disclosure. The configuration shown in FIG. 5 is merely an example, and other configurations may be used without departing from the scope of the present disclosure.

Referring to FIG. 5, the transmission device 100 includes an antenna unit 110, a beamforming transceiver 120, a_processor 130, a memory 140, a user interface module 150, a distance discovering instrument 160, and a direction discovering instrument 170. The antenna unit 110 includes a plurality of antenna arrays, and serves to transmit and receive signals. For example, the antenna unit 110 transmits and receives signals of a 60 GHz band using mmWave technology. The beamforming transceiver 120 forms one or more beams and processes signals to be transmitted and received through the formed beams. For example, the beamforming transceiver 120 may include an encoder, a modulator, a demultiplexer, a beamformer, a beamforming vector forming device, an orthogonal frequency division multiplexing (OFDM) modulator, a radio frequency (RF) processor, etc.

The processor 130 controls the overall operations of the transmission device 100. In particular, the processor 130 discovers according to exemplary embodiments of the present disclosure, and displays a device map according to a result of discovering. The memory 140 stores a program for performing the operations of the transmission device 100, and data which is generated by performing the operations. The user interface module 150 is for interfacing between the device and the user, and includes an input module and a display module. The distance discovering instrument 160 discovers distances to neighboring devices according to exemplary embodiments of the present disclosure. The direction discovering instrument 170 discovers directions of the neighboring devices according to exemplary embodiments of the present disclosure.

According to an exemplary embodiment, an apparatus for discovering for a certain wireless device in a wireless communication system includes a discovering instrument to discover a location of at least one neighboring wireless device, and the processor 130 to convert the location information of the neighboring wireless devices discovered by the discovering instrument into displayable map information.

According to an exemplary embodiment, the user interface module 150 displays the map information converted by the processor 130 as a device map. According to another exemplary embodiment, the user interface module 150 displays information on some areas selected from the device map. According to another exemplary embodiment, the user interface module 150 scales the device map and displays the same.

According to an exemplary embodiment, the beamforming transceiver 120 transmits data to at least one wireless device displayed on the device map.

According to an exemplary embodiment, the map information includes a radial chart showing a distance and a direction, and location information of the neighboring wireless devices displayed on the radial chart, and the location information of the neighboring wireless devices includes distance information and direction information.

According to an exemplary embodiment, the discovering instrument includes the distance discovering instrument 160 to discover distance information of the neighboring wireless devices, and the direction discovering instrument 170 to discover direction information of the neighboring wireless devices. According to an exemplary embodiment, the distance discovering instrument 160 may discover the distance information of the neighboring wireless devices by estimating the time taken until a predetermined signal arrives at a neighboring wireless device after the signal is transmitted to the neighboring wireless device. According to an exemplary embodiment, the direction discovering instrument 170 measures the intensities of signals exchanged with the neighboring wireless devices in one or more beam directions, and discovers the direction information of the neighboring wireless devices based on the measured intensities of the signals.

An operation of tracing locations of reception devices according to an exemplary embodiment is performed as follows:

A transmission device and a reception device can trace each other's locations by exchanging signals with each other. When there exist a plurality of reception devices, the transmission device allocates time resources or frequency resources to the reception devices, and traces the locations of the plurality of reception devices by exchanging signals within the allocated resources. The transmission device may trace the locations of the reception devices through triangulation after combining a technique of estimating a distances to a reception devices based on a time-of-arrival (TOA) of an exchanged signal, a technique of estimating relative distances of reception devices based on a time-difference-of-arrival (TDA) of an exchanged signal, and a technique of estimating a direction of a reception device based on an angle-of-arrival (AOA) of an exchanged signal, and may trace the locations of the reception devices by filtering a location estimation value calculated at regular intervals through Kalman filtering or Particle filtering. The exemplary embodiments of the present disclosure which will be described below will be explained as examples of a ranging technique which estimates a distance between devices based on a TOA of an exchanged signal based on a 60 GHz WiFi signal, and a direction estimating technique which estimates a direction of a device by measuring directionality. However, those exemplary embodiments of the present disclosure are merely examples and other exemplary embodiments may be implemented without departing from the scope of the present disclosure.

Figure 6:
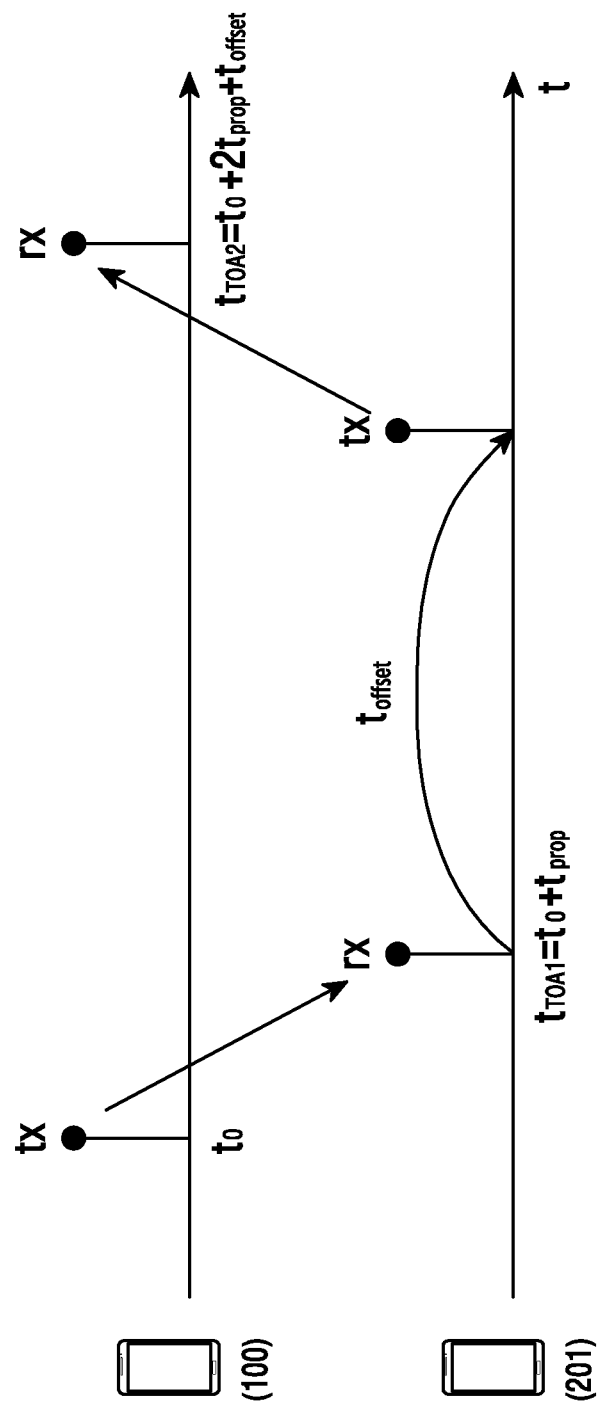
FIGS. 6 to 8 illustrate views to explain an operation of discovering a distance to a reception device according to an exemplary embodiment of the present disclosure.
Figure 7:
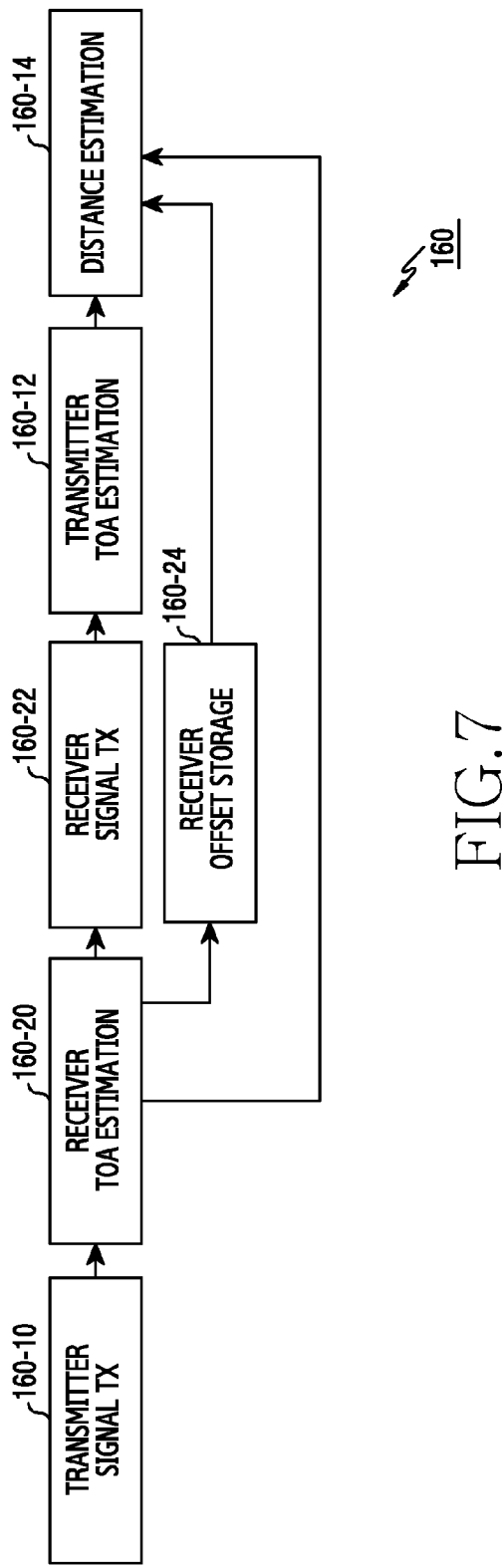
Figure 8:
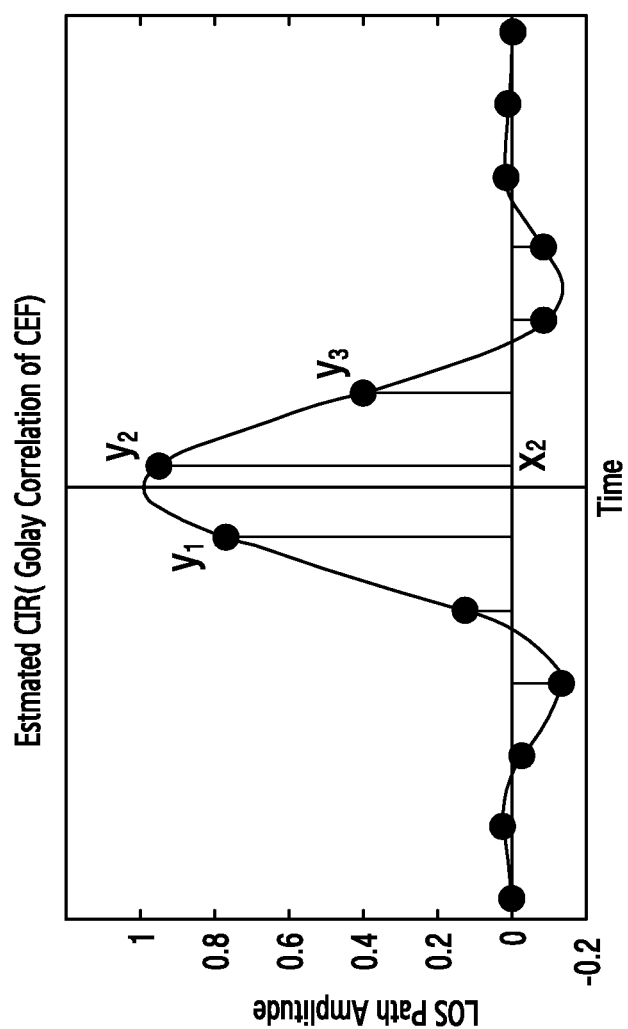

FIGS. 6 to 8 illustrate views to explain an operation of discovering a distance of a reception device according to an exemplary embodiment of the present disclosure.

Referring to FIG. 6, a two-way ranging method is used to estimate a distance between the transmission device 100 and the reception device 201. A radio propagation time $t_{prop}$ between the two devices may be calculated based on a TOA which is estimated when a 60 GHz WiFi signal is exchanged as in Equation 1 presented below, and a distance d between the two devices may be calculated as in Equation 2 presented below:

$$t_{prop}=(t_{TOA2}-t_0-t_{offset})/2 \qquad \text{Equation 1}$$

$$d=ct_{prop} \qquad \text{Equation 2}$$

where c is the speed of light.

Referring to FIG. 7, when the distance discovering instrument 160 illustrated in FIG. 5 estimates the distance between the transmission device 100 and the reception device 201, block 160-14 may use values which are calculated by blocks 160-12, 160-24, and 160-20.

Block 160-10 calculates a time to at which the transmission device 100 transmits a signal.

Block 160-20 estimates TOA $t_{TOA1}$ at a time when the reception device 201 receives the signal. $t_{TOA1}$ is calculated by obtaining a sum of to calculated by block 160-10 and the radio propagation time $t_{prop}$ between the two devices. Block 160-22 calculates a time at which the reception device 201 transmits a signal. The time calculated by block 160-22 is a sum of $t_{TOA1}$ and $t_{offset}$, that is, $(t_0+t_{prop}+t_{offset})$. Block 160-24 calculates $t_{offset}$ based on a difference between the time at which the reception device 201 transmits the signal and $t_{TOA1}$ calculated by block 160-20.

Block 160-12 estimates TOA $t_{TOA2}$ at a time when the transmission device 100 receives the signal. $t_{TOA2}$ is calculated by obtaining a sum of $(t_0+t_{prop}+t_{offset})$ calculated by block 160-22 and the radio propagation time $t_{prop}$ between the two devices. That is, $t_{TOA2}$ is $(t_0+2t_{prop}+t_{offset})$. Block 160-24 estimates the distance between the transmission device 100 and the reception device 201 according to a result of calculating by block 160-12. The distance between the two devices, which is estimated by block 160-24, is as in Equation 2.

In the ranging technique, it is important to estimate the TOA. In order to increase the accuracy of the estimation of the TOA, a pseudo-random (PR) code which has an excellent auto-correlation property may be used, or a Golay sequence which has an excellent auto-correlation property and has the advantage of performing channel estimation simultaneously may be used.

Referring to FIG. 8, an example of signal exchange using the Golay sequence which is used in a preamble of a 60 GHz WiFi packet is illustrated. The dots in the drawing indicate the results of passing the Golay sequence received through an analog-to-digital converter (ADC) through a Golay correlator. The exact TOA of the signal is a time index which is indicated by the middle line. The time index x2 corresponding to the dot y2 from among the dots is close to the exact TOA. However, how far from the exact TOA x2 is should be calculated in order to estimate the exact TOA. This is calculated as in Equation 3 presented below:

$$TOA = x^2 - \frac{1}{2} - Re\left\{\frac{(y_1 - y_2)}{(y_2 - y_3)-(y_1 - y_2)}\right\} \quad \text{Equation 3}$$

Figure 9:
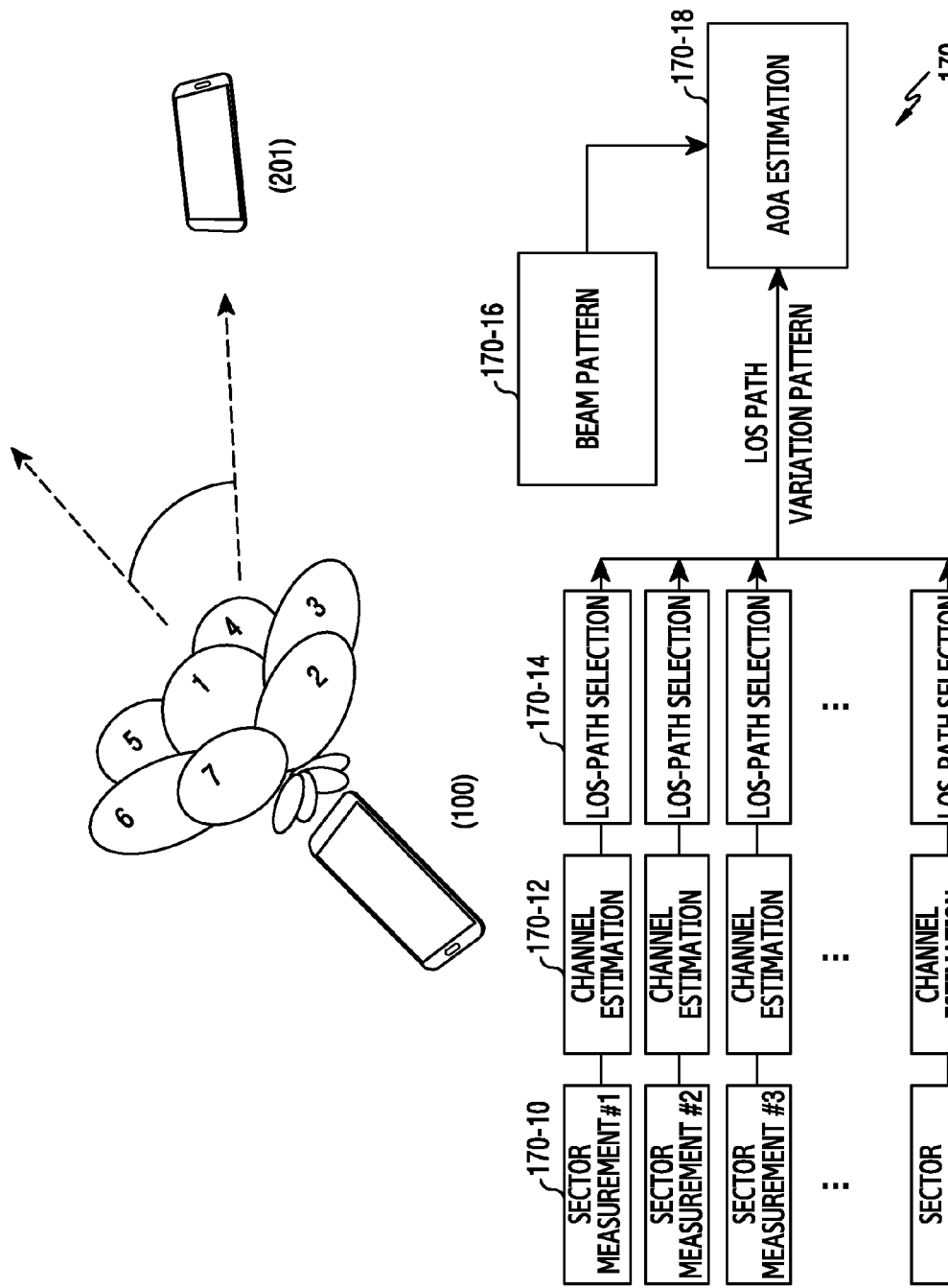
FIGS. 9 and 10 illustrate views to explain an operation of discovering a direction of a reception device according to an exemplary embodiment of the present disclosure.
Figure 10:
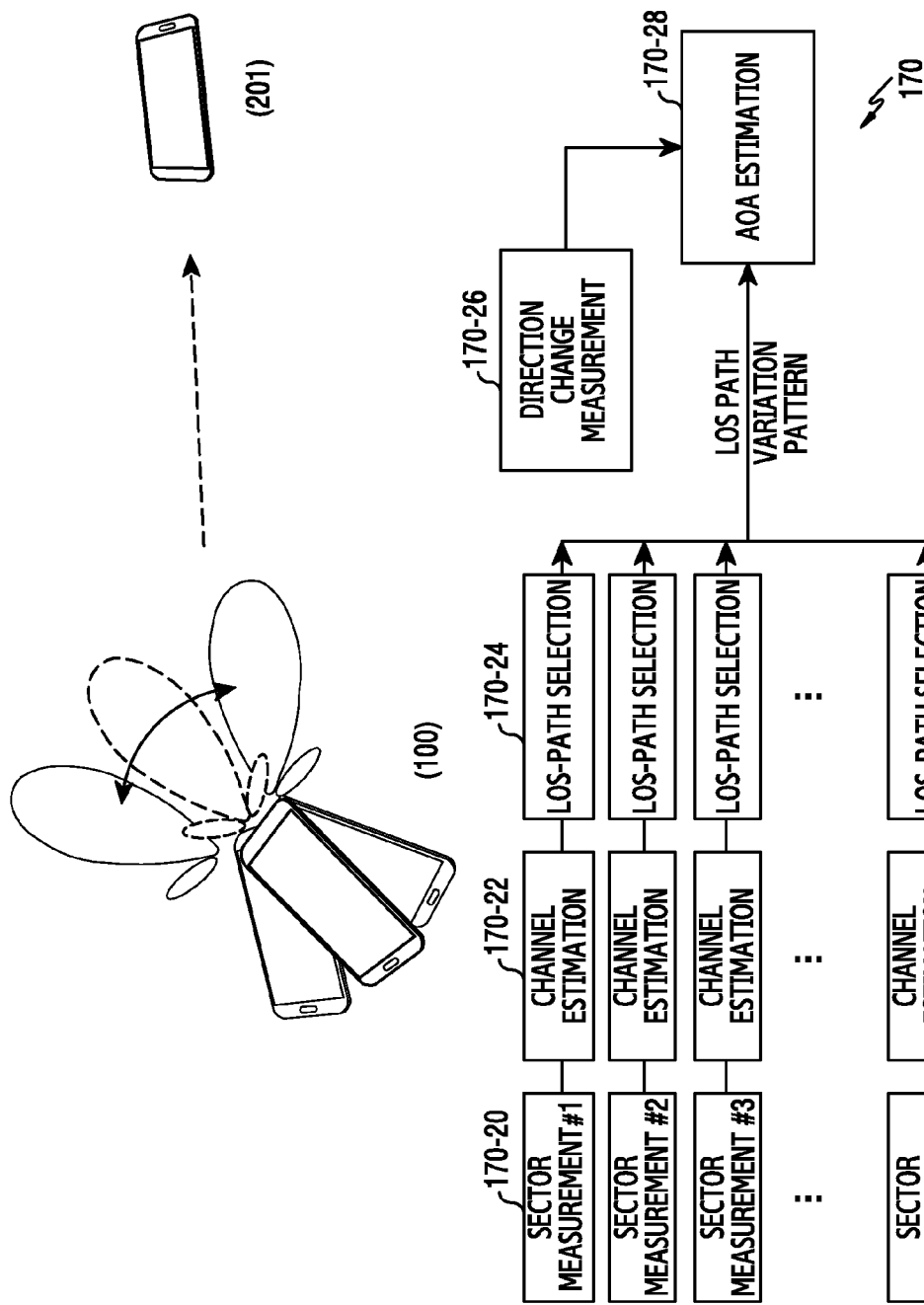

FIGS. 9 and 10 illustrate views to explain an operation of discovering a direction of a reception device according to an exemplary embodiment of the present disclosure. According to an exemplary embodiment of the present disclosure, a method for discovering a direction of a reception device includes an electric beam-sweep method as shown in FIG. 9 and a manual beam-sweep method.

Referring to FIG. 9, to perform the electric beam-sweep method, the direction discovering instrument 170 of the transmission device 100 includes a plurality of sector measurement instruments 170-10, a plurality of channel estimation instruments 170-2, a plurality of line-of-sight (LOS) path selectors 170-14, a beam pattern storage 170-16, and an angle of arrival (AOA) estimation instrument 170-18. The plurality of sector measurement instruments 170-10 measure intensities of signals when exchanging the signals with the reception device, while changing an antenna beam direction through antenna beamforming. The plurality of channel estimation instruments 170-12 correspond to the plurality of sector measurement instruments 170-10, respectively, and estimate corresponding channels. The plurality of LOS path selectors 170-14 correspond to the plurality of channel estimation instruments 170-12, and select LOS paths by searching peaks at the estimated channels. The AOA estimation instrument 170-18 compares an LOS path variation pattern outputted from the plurality of LOS path selectors 170-14, and a beam pattern pre-stored in the beam pattern storage 170-16, and estimates the AOA according to a result of the comparing. Accordingly, the transmission device 100 estimates the direction of the reception device.

Referring to FIG. 10, to perform the manual beam-sweep method, the direction discovering instrument 170 of the transmission device 100 includes a plurality of sector measurement devices 170-20, a plurality of channel estimation instruments 170-22, a plurality of LOS path selectors 170-24, a direction change measurement instrument 170-26, and an AOA estimation instrument 170-28. The plurality of sector measurement instruments 170-20 may fix the antenna beams of the transmission device 100 forward, and measure intensities of signals when exchanging the signals with the reception device, while changing the antenna beam direction with user's hand. The plurality of channel estimation instruments 170-22 correspond to the plurality of sector measurement instruments 170-20, respectively, and estimate corresponding channels. The plurality of LOS path selectors 170-24 correspond to the plurality of channel estimation instruments 170-22, respectively, and select LOS paths by searching peaks at the estimated channels. The AOA estimation instrument 170-28 compares an LOS path variation pattern outputted from the plurality of LOS path selectors 170-24, and a measurement beam pattern by the direction change measurement instrument 170-26 which may be implemented by a gyroscope sensor, and estimates the AOA according to a result of the comparing. Accordingly, the direction of the reception device is estimated.

A device map may be drawn to indicate the relative location of the reception device with reference to the location and the direction of the transmission device based on the distance and direction information between the devices, which are collected in the method described above with reference to FIGS. 6 to 10. The device map may indicate that the reception device is on the corresponding location. According to an exemplary embodiment, the device map may be updated at regular intervals, thereby reflecting the result of tracing the location of the reception device.

Figure 11:
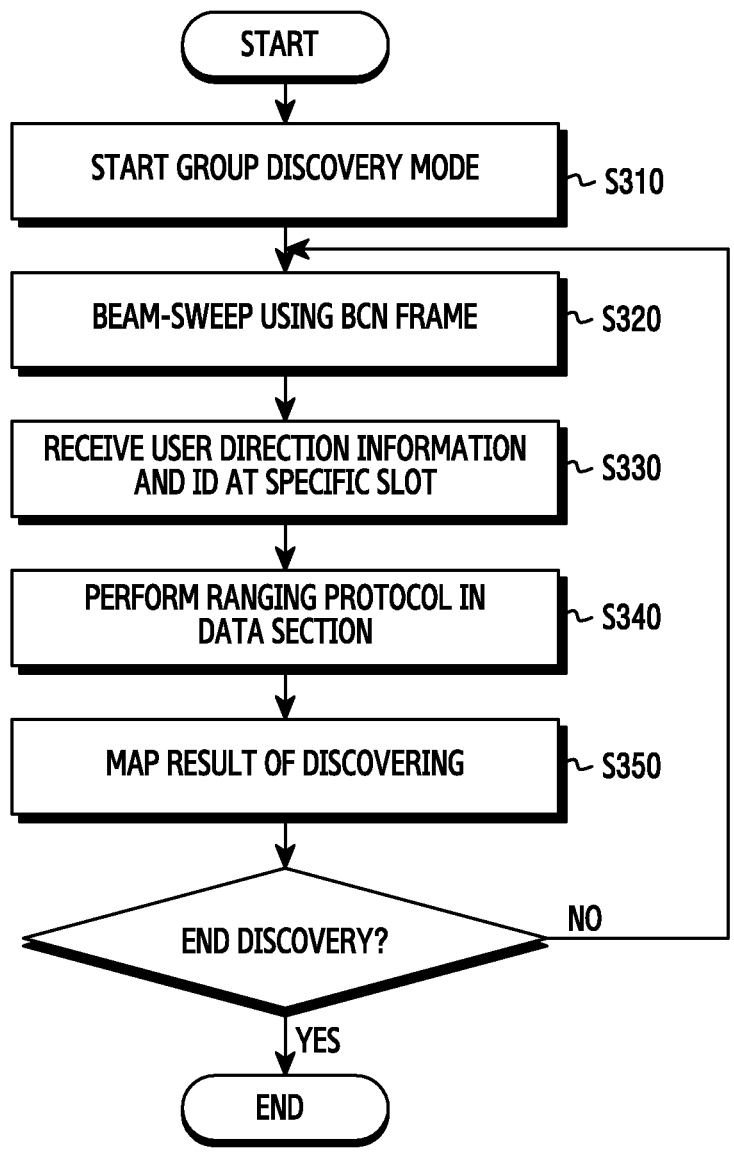
FIG. 11 illustrates a view showing a processing flow of a transmission device to discover a distance and a direction of a reception device according to an exemplary embodiment of the present disclosure.

FIG. 11 illustrates a view showing a processing flow of the transmission device 100 to discover a distance and a direction of a reception device according to an exemplary embodiment of the present disclosure.

Referring to FIG. 11, in step S310, the transmission device 100 starts a group discovery mode. In step S320, the transmission device 100 beam-sweeps using a beacon (BCN) frame. In step S330, the transmission device 100 receives user direction information and an identifier (ID) at a specific slot. In step S340, the transmission device 100 performs a ranging protocol in a data section. In step S350, the transmission device 100 maps results of discovering. Operations in steps S320 to S350 are repeated until the discovering is determined to be completed in step S360.

Figure 12:
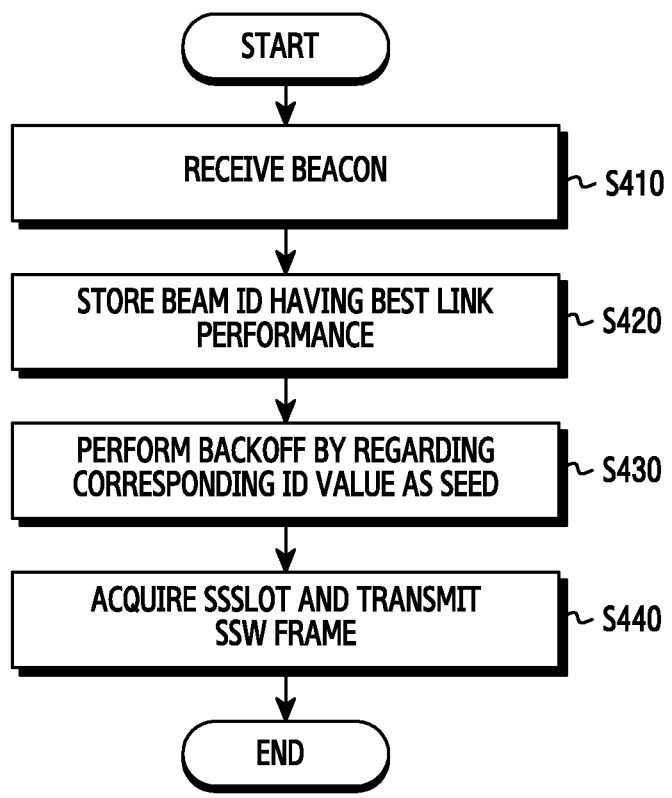
FIG. 12 illustrates a view showing a processing flow of a reception device to discover a direction of the reception device according to an exemplary embodiment of the present disclosure.

FIG. 12 illustrates a view showing a processing flow of the reception device 201 to discover the direction of the reception device according to an exemplary embodiment of the present disclosure.

Referring to FIG. 12, in step S410, the reception device 201 receives a bean frame. In step S420, the reception device 201 stores a beam ID having the best link performance. In step S430, the reception device 201 performs a backoff algorithm in which a corresponding ID value is regarded as a seed. In step S440, the reception device 201 acquires an SSSLOT and transmits a sector sweep (SSW) frame.

Figure 13:
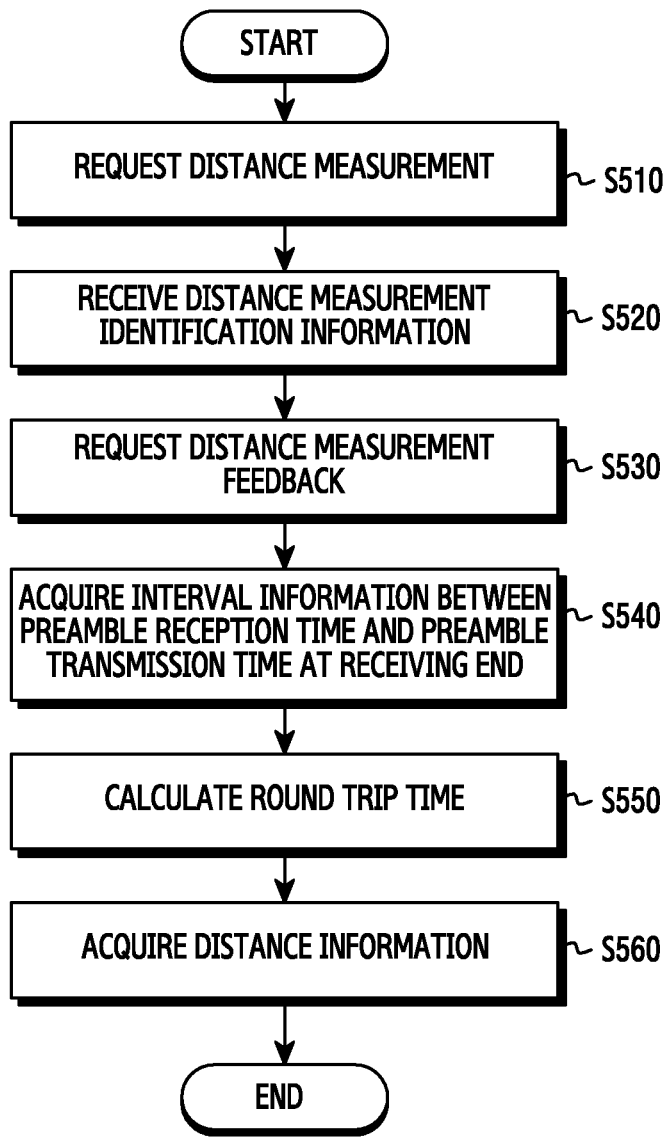
FIG. 13 illustrates a view showing a processing flow of a transmission device to discover a distance to a reception device according to an exemplary embodiment of the present disclosure.

FIG. 13 illustrates a view showing a processing flow of the transmission device to discover a distance to a reception device according to an exemplary embodiment of the present disclosure.

Referring to FIG. 13, in step S510, the transmission device 100 transmits distance measurement (ranging measurement) request information. In step S520, the transmission device 100 receives distance measurement identification information. In step S530, the transmission device 100 transmits distance measurement feedback request information. In step S540, the transmission device 100 acquires interval information between a preamble reception time and a preamble transmission time at a reception side. In step S550, the transmission device 100 calculates a round trip time. In step S560, the transmission device 100 acquires distance information.

Figure 14:
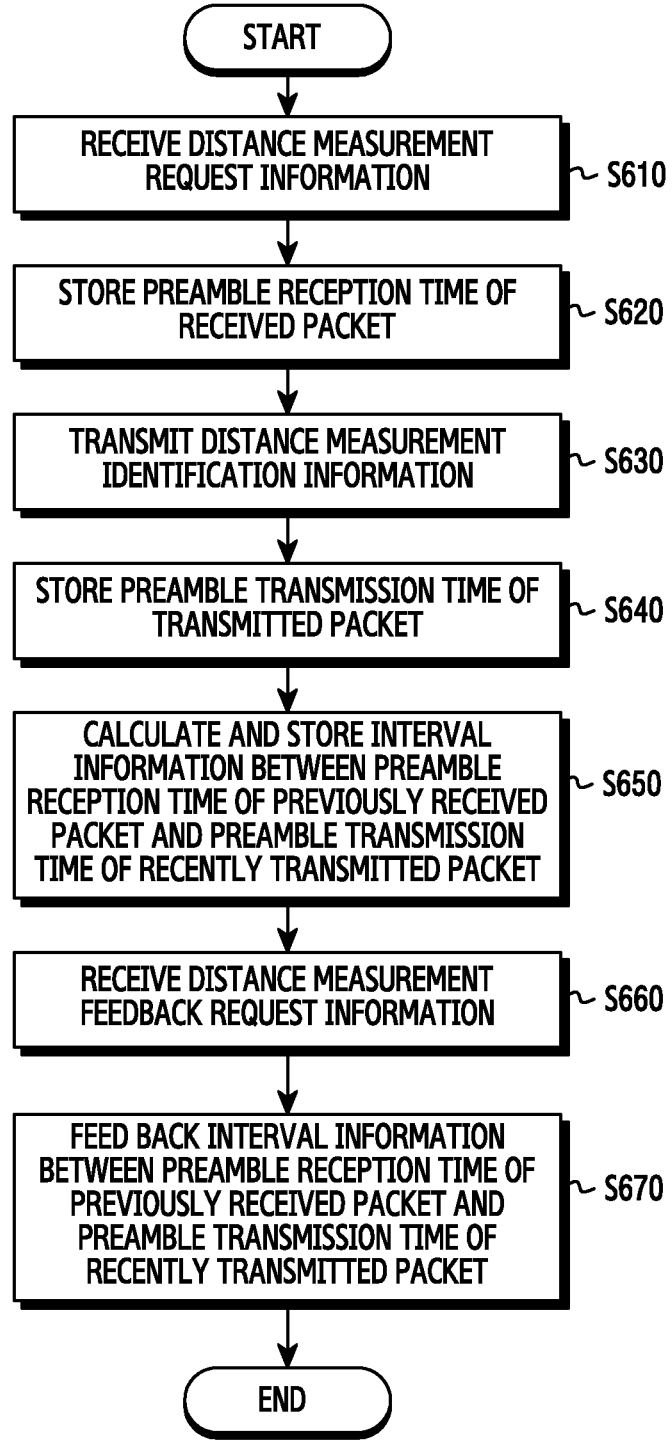
FIG. 14 illustrates a view showing a processing flow of a reception device to discover a distance of the reception device according to an exemplary embodiment of the present disclosure.

FIG. 14 illustrates a view showing a processing flow of the reception device to discover the distance of the reception device according to an exemplary embodiment of the present disclosure.

Referring to FIG. 14, in step S610, the reception device 201 receives distance measurement request information. In step S620, the reception device 201 stores a preamble reception time of a received packet. In step S630, the reception device 201 transmits distance measurement identification information. In step S640, the reception device 201 stores a preamble transmission time of a transmitted packet. In step S650, the reception device 201 calculates interval information between the preamble reception time of a previously received packet and the preamble transmission time of a recently transmitted packet, and stores the interval information. In step S660, the reception device 201 receives distance measurement feedback request information. In step S670, the reception device 210 may feedback interval information between the preamble reception time of the previously received packet and the preamble transmission time of the recently transmitted packet.

An operation of estimating a distance and a direction between devices is performed as shown in FIG. 11 described above. The transmission device 100 enters the discovery mode to discover the locations of neighboring devices, and starts the operation as a personal basic service set control point (PCP) of 60 GHz WiFi (S310 of FIG. 11), and broadcasts beacon signals (or frame) by sweeping the signals in all directions (S320).

When the reception device 201 receives the beacon signals (S410 of FIG. 12), the reception device 201 selects a specific time and transmits a response signal. In this case, the reception device 201 transmits beam ID information of a beacon signal in a direction having the best link performance from among the beacon signals transmitted by the transmission device 100 (S420).

Figure 15:
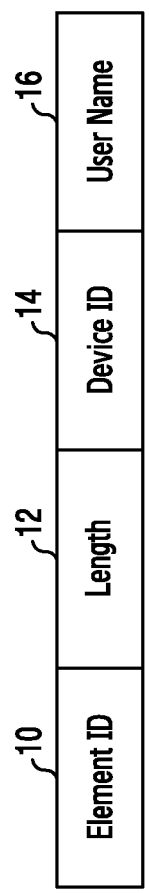
FIGS. 15 and 16 illustrate views showing examples of frame formats which are exchanged among devices during a location discovering operation of a reception device according to an exemplary embodiment of the present disclosure.

The transmission device 100 may identify a direction the reception device 201 is oriented to using the direction-related information received from the reception device 201. The reception device 201 may transmit device information 14 (a device ID) of the reception device, or name information (user name) 16 used in an application as shown in FIG. 15 at the same time of transmitting the direction-related information. This information may be utilized as information for identifying a device with the location information in the step in which the transmission device 100 discovers the reception device 201 and then maps (S350).

Referring to FIG. 15, the information that the reception device 201 transmits to the transmission device 100 to discover the direction according to an exemplary embodiment of the present disclosure includes an element ID field 10, a length field 12, a device ID field 14, and a user name field 16.

By performing steps S320 and S330 of FIG. 11, the transmission device 100 discovers the direction information of the reception device 201, and then performs a procedure for discovering the distance information of the reception device 201. To achieve this, the transmission device 100 performs a protocol which can perform a ranging algorithm as shown in FIGS. 6 to 8 (S340). This process is performed in two steps. The first step is performed to measure information for predicting a round trip delay for ranging, and the second step is performed to feedback the measured information. The first step and the second step are performed in sequence. A ranging packet shown in FIG. 16 is used to perform the ranging operation according to an exemplary embodiment of the present disclosure.

Figure 16:
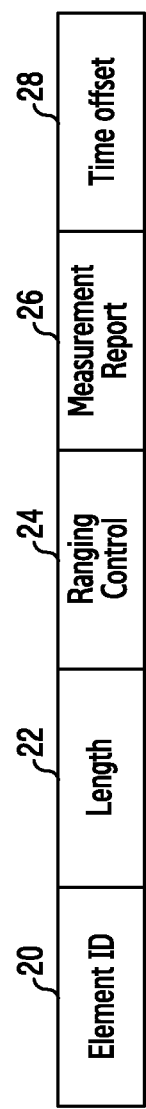

Referring to FIG. 16, the ranging packet for discovering the distance according to an exemplary embodiment of the present disclosure includes an element ID field 20, a length field 22, a ranging control field 24, a measurement report field 26, and a time offset field 28. The ranging control field 24 is a field to define a characteristic of the ranging packet, and may be defined as shown in table 1 presented below. The measurement report field 26 is a field to inform of a result of measuring distance information. The time offset field 28 is a field to measure a real round trip delay.

TABLE 1

| Value | Type |
| --- | --- |
| b00 | Ranging Measurement Request |
| b01 | Ranging Measurement Response |
| b10 | Ranging Feedback Request |
| b11 | Ranging Feedback Response |
| Besides | Reserved |

The operation flow of the transmission device 100 for ranging is the same as in FIG. 13 described above. The transmission device 100 sets the ranging control field 24 of FIG. 16 as a ranging measurement request, and requests information for calculating the round trip time from the reception device 201 (S510). When the transmission device 100 receives confirmation information indicating that normal time offset information is prepared from the reception device 201 (S520), the transmission device 100 sets the ranging control field 24 as a ranging feedback request, and requests corresponding information (S530). When the transmission device 100 receives a packet in which the ranging control field 24 is set as a ranging feedback response from the reception device 201, the transmission device 100 acquires information existing in the time offset field 28 (S540). The information included in the time offset field 28 is a time interval between a time at which a preamble of a ranging measurement request packet is received at the reception device 201 and a time at which a preamble of a ranging measurement response packet is transmitted. The transmission device 100 calculates the round trip delay by subtracting a time offset value from the interval between the time at which the preamble of the ranging measurement request packet is transmitted and the time at which the preamble of the ranging measurement response packet is received, and calculates the distance information based on the round trip delay (S550 and S560).

The operation flow of the reception device 201 for ranging is the same as in FIG. 14 described above. When the reception device 201 receives a ranging measurement request packet (S610), the reception device 201 stores information on a time at which a preamble of this packet is received, and transmits a ranging measurement response packet (S620, S630). In this case, the reception device 201 also stores information on a time at which a preamble of the ranging measurement response packet is transmitted (S640). Thereafter, when a ranging feedback request packet is received from the transmission device 100 (S660), the reception device 201 inserts time interval information to the time offset field 28 of FIG. 16 and transmits a ranging feedback response packet (S670). Through the ranging procedure described above, the transmission device 100 may measure the distance to the reception device 201.

Figure 17:
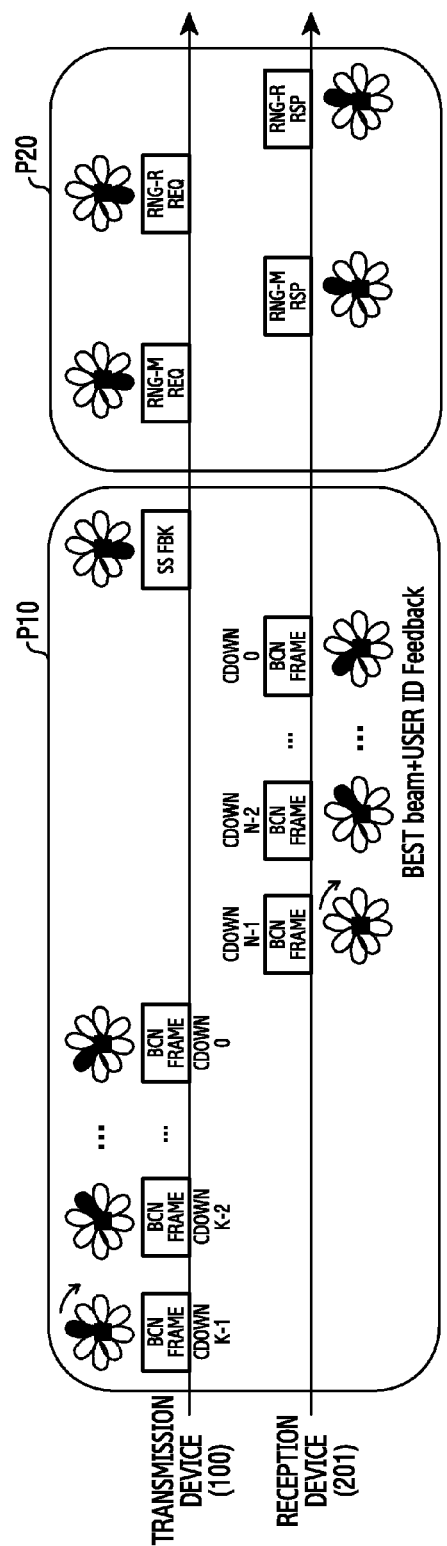
FIG. 17 illustrates a view showing examples of frames which are exchanged among transmission and reception devices for the sake of a location discovering operation of a reception device according to an exemplary embodiment of the present disclosure.

FIG. 17 illustrates a view showing examples of frames which are transceived between the transmission and reception devices to discover the location of the reception device according to an exemplary embodiment of the present disclosure. In this example, a process P10 to discover the direction of the reception device 201 and a process P20 to discover the distance to the reception device 201 are performed.

Figure 18:
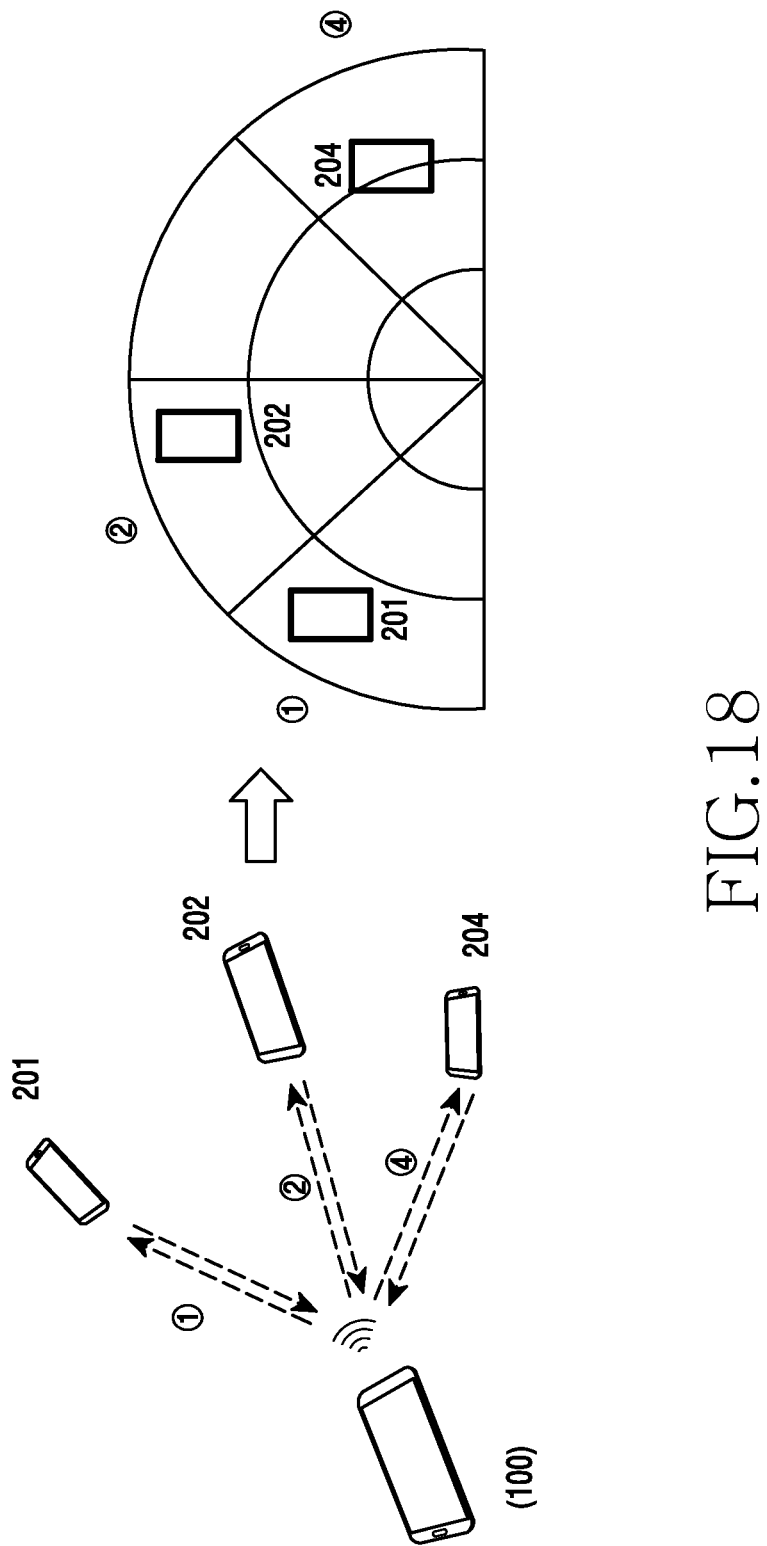
FIGS. 18 to 20 illustrate views showing examples of transmission of frames to prevent a collision among reception devices when discovering the directions of the reception device according to an exemplary embodiment of the present disclosure.
Figure 19:
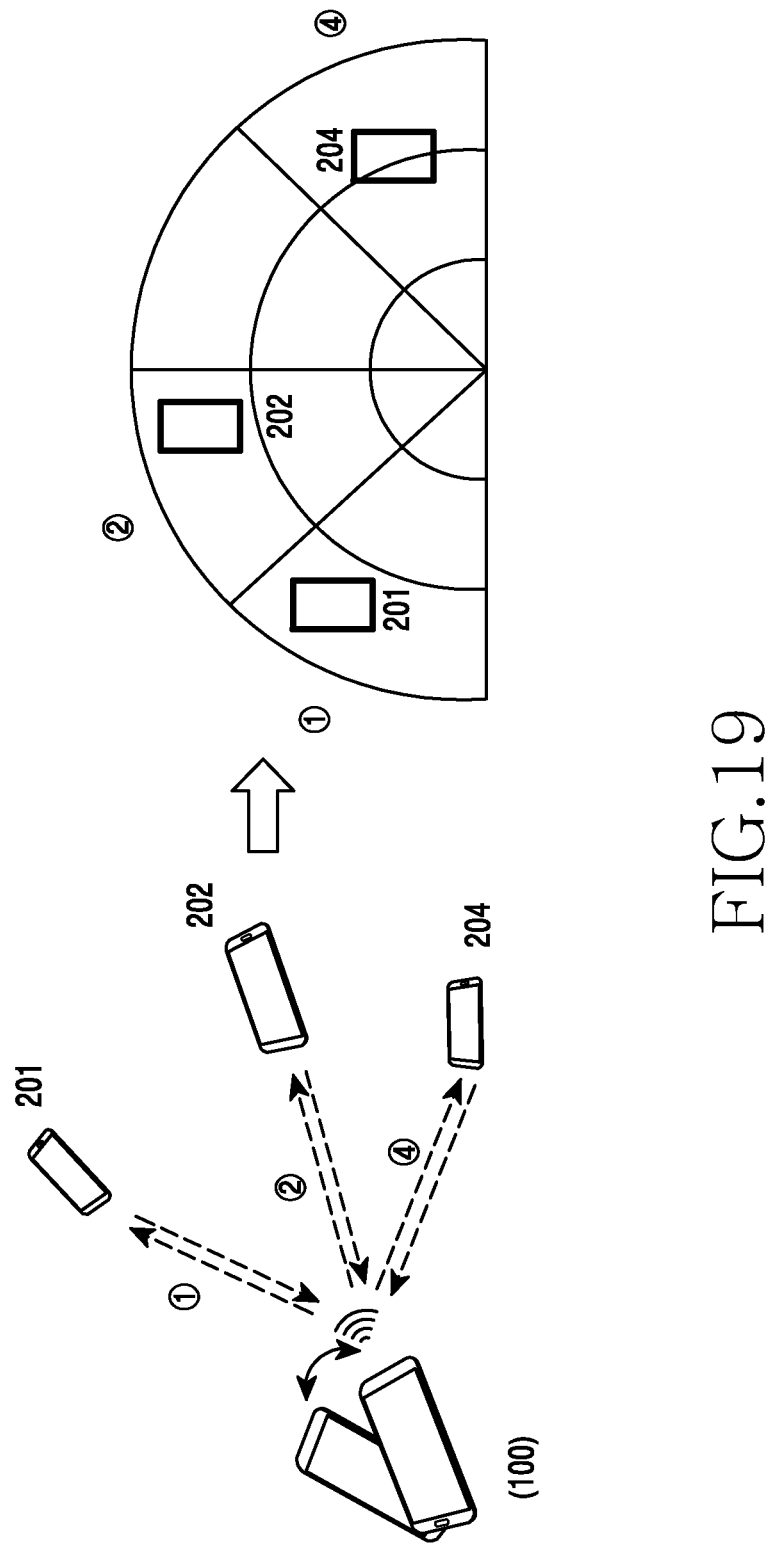
Figure 20:
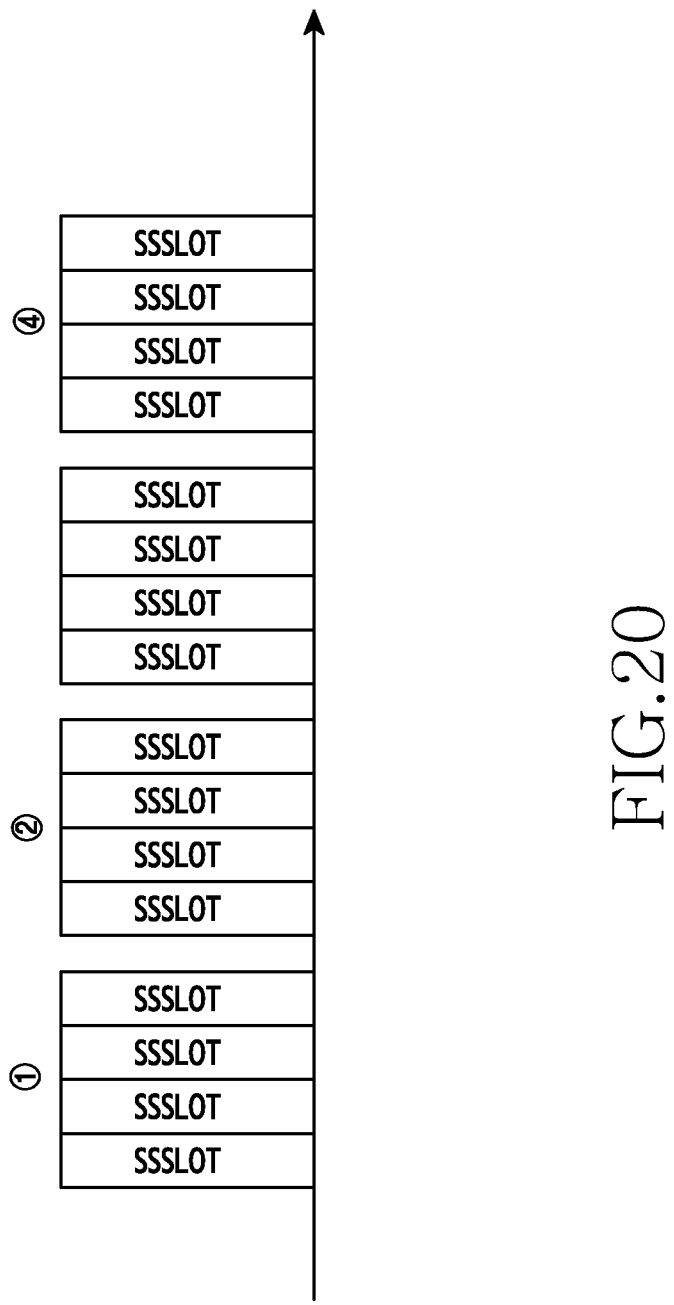

FIGS. 18 to 20 illustrate views showing examples of transmission of frames to prevent a collision among the reception devices when discovering the directions of the reception devices according to an exemplary embodiment of the present disclosure.

Referring to FIG. 17, in a detailed example of estimating a direction according to an exemplary embodiment of the present disclosure, a sector level sweep protocol defined in the IEEE 802.11ad spec may be used. The transmission device 100 serves as a PCP and periodically transmits beacon (BCN) frames. In this case, the transmission device 100 transmits the beacon frames while sweeping in directions of all sectors. The reception device 201 which has received the beacon frames responds using SSW frames in an association beamforming training (A-BFT) section according to an operation defined in the 802.11ad spec. In this case, to avoid a collision with other devices, the reception device 201 selects one of the plurality of SSSLOTs and transmits the SSW frames. A backoff algorithm based on a beam ID as shown in FIG. 20 is used to reduce the probability of collision among the reception devices.

Referring to FIG. 20, an algorithm to divide a backoff count area selected according to a selected beam ID is applied. In this case, many reception devices may receive the beacon frames swept by the transmission device, and access the SSSLOTs in sequence according to an ordering of the selected beam ID value without a collision. For example, as shown in FIGS. 18 and 19, the reception device 201 may access the SSSLOT in section ①, the reception device 202 may access the SSSLOT in section ②, and the reception device 204 may access the SSSLOT in section ④.

When the area which can be discovered by electric beamforming is 10 limited as shown in FIG. 18, the discovering area may be extended by manually changing the direction of the transmission device 100 as shown in FIG. 19. In this case, the direction of the reception device may be determined by detecting information on the changed direction of the transmission device 100 through the location change measurement instrument 170-26 (for example, a gyroscope sensor) as shown in FIG. 10, and combining this information with direction information of electric beams.

Figure 21:
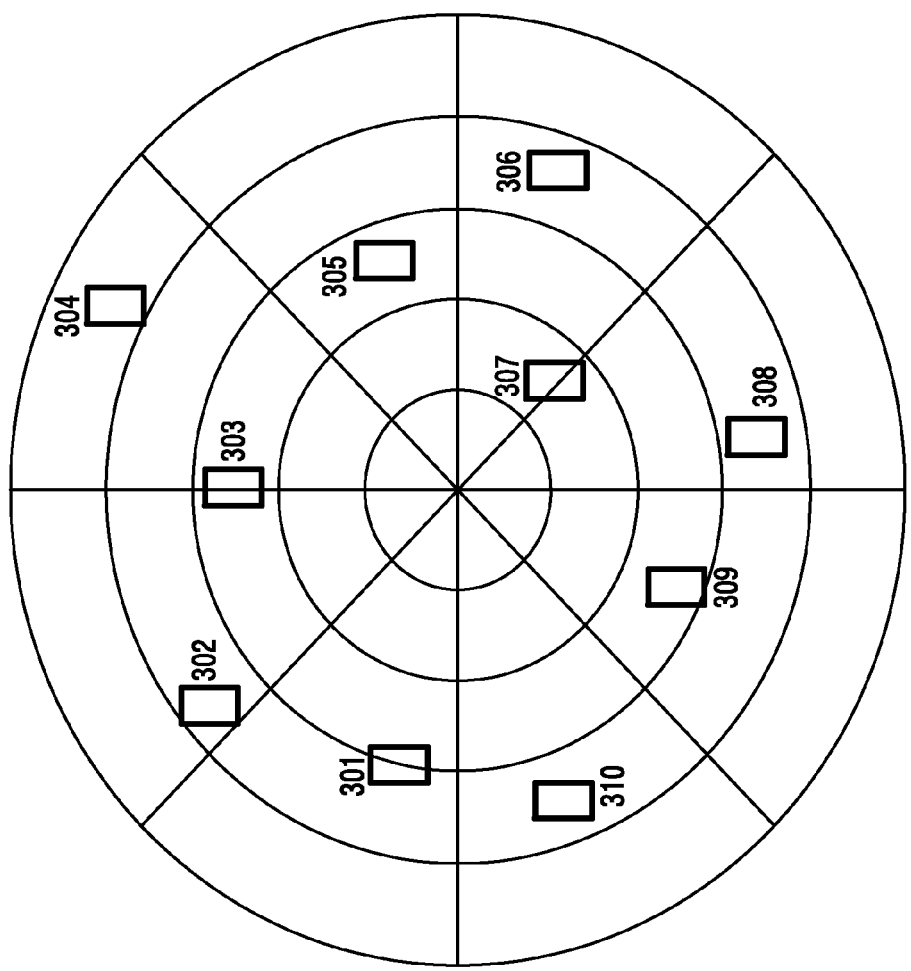
FIG. 21 illustrates a view showing an example of conversion of location information of discovered reception devices into map information according to an exemplary embodiment of the present disclosure.

FIG. 21 illustrates a view showing an example of conversion of location information of discovered reception devices into map information according to an exemplary embodiment of the present disclosure. The locations of the reception devices 301-310 in all directions are discovered with reference to the transmission device and displayed as shown in FIG. 21.

Figure 22:
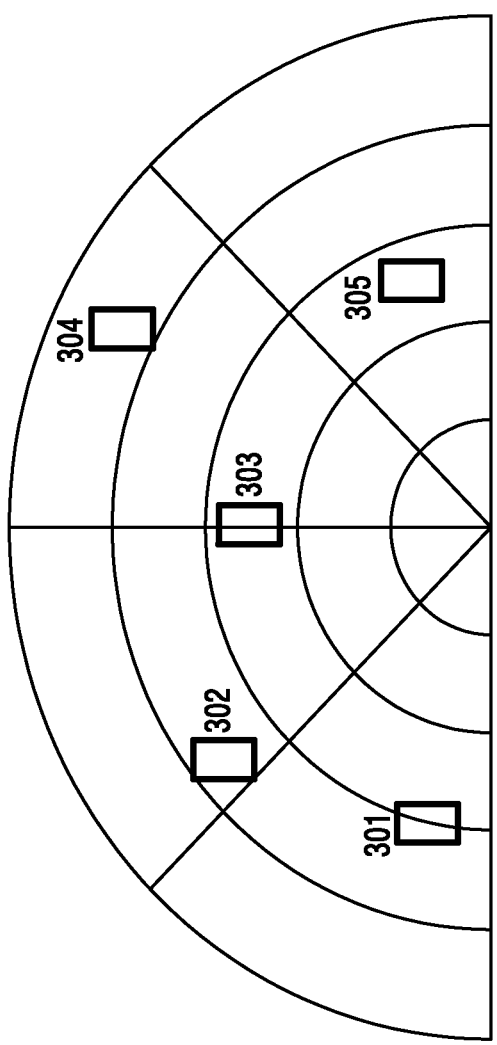
FIG. 22 illustrates a view showing an example of a basic map which is displayed according to an exemplary embodiment of the present disclosure.

FIG. 22 illustrates a view showing an example of basic map information which is displayed according to an exemplary embodiment of the present disclosure. As shown in FIG. 21, only a map showing reception devices existing in the forward direction of 180 degrees rather than the reception devices 301-310 in all directions is displayed on the user interface module 150 of the transmission device 100 as a basic map. That is, the reception devices 301-305 existing in the forward direction of 180 degrees with reference to the transmission device 100 are displayed on the basic map. The basic map according to an exemplary embodiment of the present disclosure is formed in the form of a radial chart according to distances and directions, and location information of the discovered neighboring wireless devices is displayed on the radial chart.

FIGS. 23A to 24C illustrate views showing examples of a basic device map which is adjusted and displayed according to an exemplary embodiment of the present disclosure.

Figure 23A:
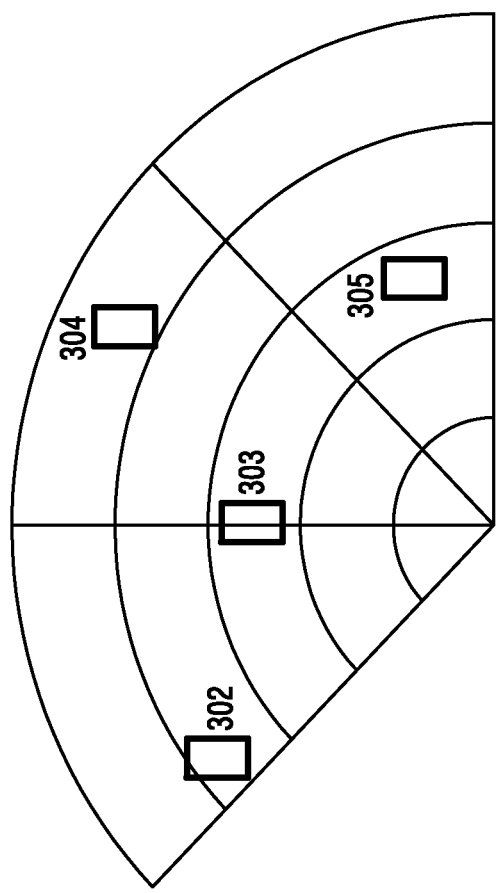
Figure 23B:
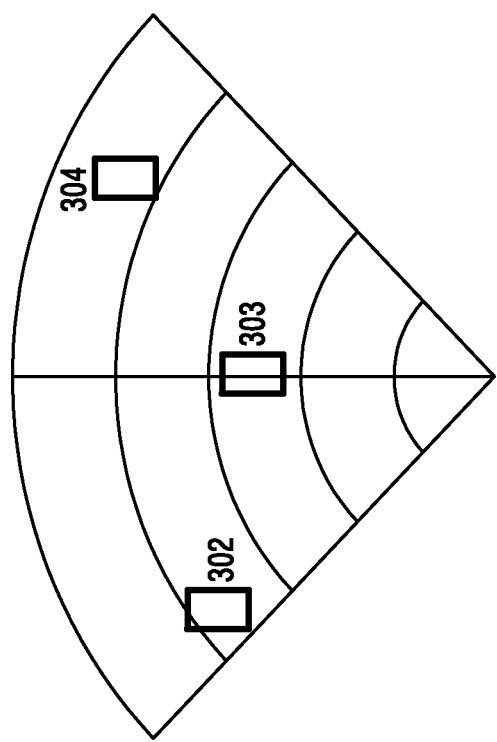

Referring to FIGS. 23A and 23B, only some areas of the basic device map may be selected and displayed. Some areas of the basic device map may be selected as a user's viewing angle is adjusted according to user's intention. As shown in FIG. 23A, a map corresponding to the area ranging from 0 to 135 degrees may be selected and displayed. In this case, the locations of the devices 302-305 are displayed. As shown in FIG. 23B, a map corresponding to the area ranging from 45 to 135 degrees may be selected and displayed. In this case, the locations of the devices 302-304 are displayed.

Figure 23C:
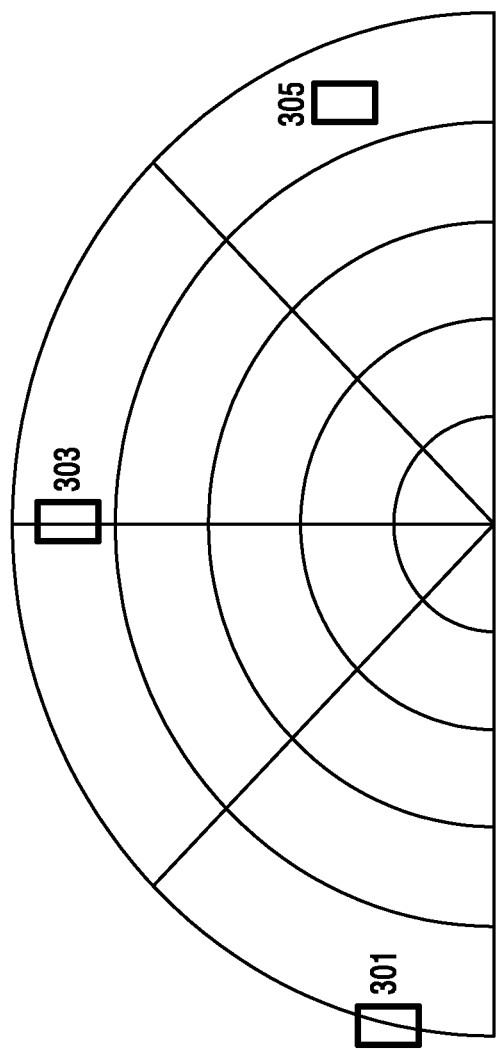

Referring to FIG. 23C, the basic device map may be zoomed in or zoomed out by adjusting the scale of the distance. For example, the basic device map may be zoomed in and thus the devices 301, 303, and 305 are displayed.

Figure 24C:
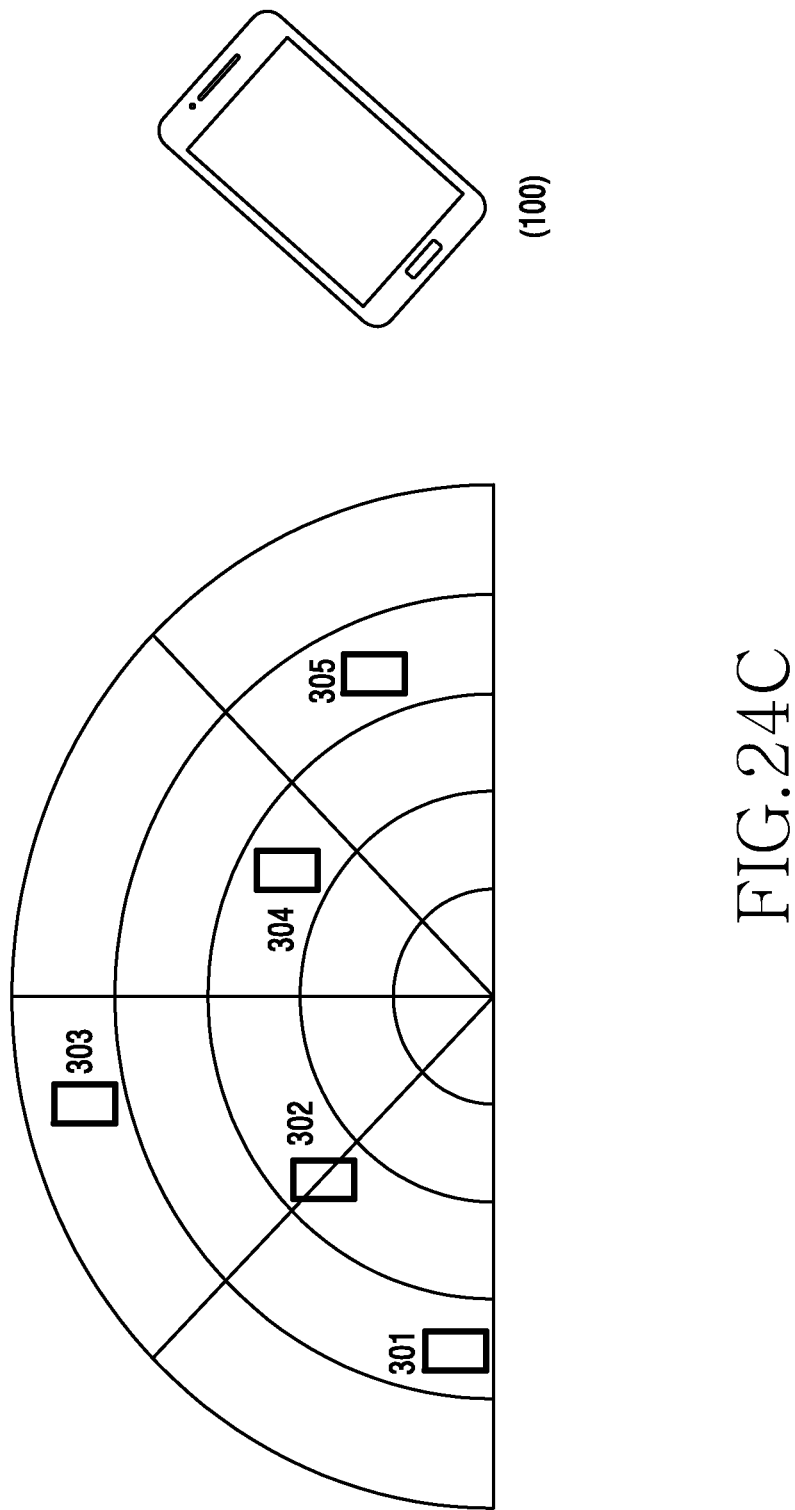

Referring to FIGS. 24A to 24C, when the direction of the transmission device 100 is changed, the locations of the reception devices appearing on the device map may be adjusted according the perspective of the transmission device 100, and displayed.

Figure 25:
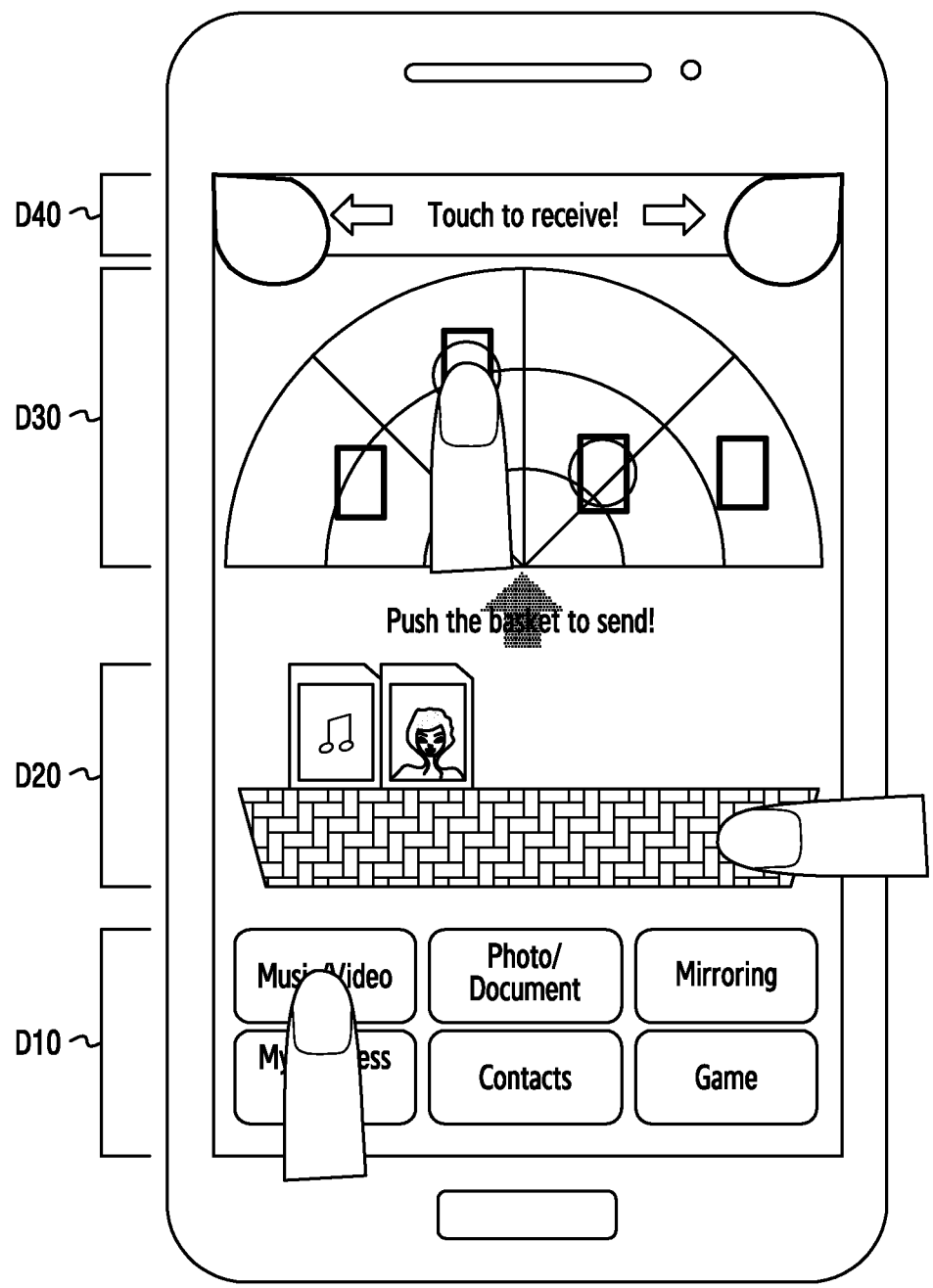
FIG. 25 illustrates a view showing an example of a display screen when data is transmitted by a transmission device according to an exemplary embodiment of the present disclosure.
Figure 26:
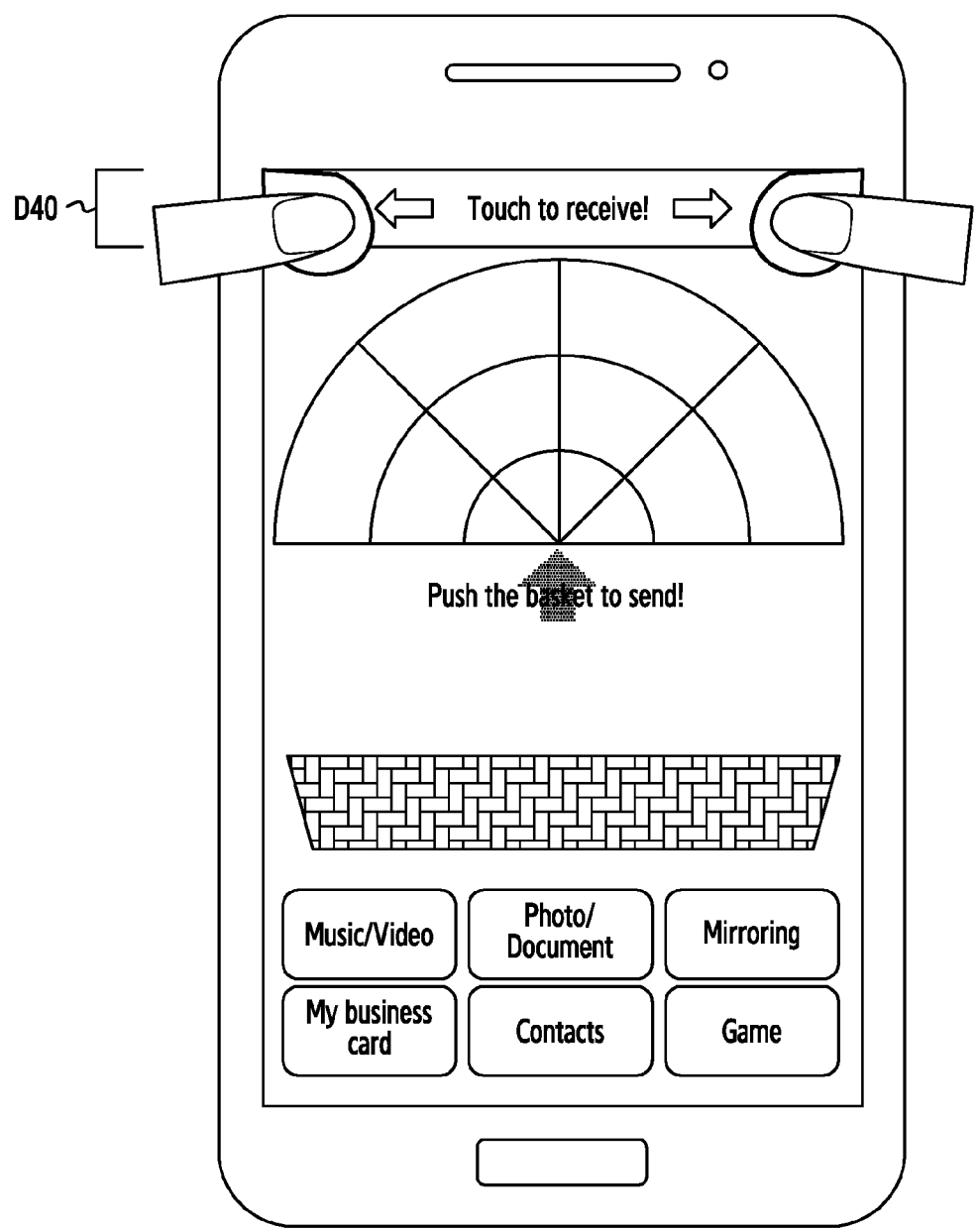
FIG. 26 illustrates a view showing an example of a display screen when data is received by a reception device according to an exemplary embodiment of the present disclosure.

FIG. 25 illustrates a view showing an example of a display screen when data is transmitted by a transmission device according to an exemplary embodiment of the present disclosure. FIG. 26 illustrates a view showing an example of a display screen when data is received by a reception device according to an exemplary embodiment of the present disclosure.

Referring to FIG. 25, the transmission device 100 may select a data type to transmit from data type information displayed on an area D10. For example, the data type includes music/video, photo/document, mirroring, my business card, contacts, game, etc. Through a user input, the transmission device 100 may select data (for example, music/video) to really transmit from among corresponding data of types. The selected data is put in a basket displayed on an area D20. Next, a target device to which the data will be transmitted is selected on a device map displayed on an area D30 through a user input. In this case, a plurality of devices may be selected.

The operation of receiving data at the reception device 201 may be performed by the user touching an upper end of a screen on an area D40 with user's two fingers as shown in FIG. 26. The operation of transmitting data at the transmission device 100 is performed by the user pushing up the basket displayed on the area D20 as shown in FIG. 25. Accordingly, the data transceiving operation is performed between the transmission device 100 and the reception device 201.

According to the exemplary embodiments of the present disclosure as described above, a certain wireless device for transmitting data discovers neighboring wireless devices and displays the locations of the discovered wireless devices as information in the form of a map. Then, the user can easily select a wireless device to transmit data to from the displayed information in the form of the map, and can easily transmit desired data to the selected wireless device.

As described above, the present disclosure has been described with limited exemplary embodiments and drawings. However, the present disclosure is not limited to the above-described exemplary embodiments and can be modified and changed by a person skilled in the art from the descriptions provided herein. For example, in the exemplary embodiments of the present disclosure, data is transceived between the wireless devices as shown in FIGS. 1 and 2. However, various types of wireless devices may be used.

In another example, the operations according to the exemplary embodiments of the present disclosure are performed by the elements of the wireless device as shown in FIG. 5. However, the operations according to the exemplary embodiments of the present disclosure may be implemented by a single processor. In this case, program commands for performing operations implemented by various computers may be recorded in a computer-readable medium. The computer-readable recording medium may include program commands, data files, and data structures either alone or in combination. The program commands may be those that are especially designed and configured for the present disclosure, or may be those that are publicly known and available to those skilled in the art. Examples of the computer-readable recording medium include magnetic recording media such as hard disks, floppy disks and magnetic tapes, optical recording media such as CD-ROMs and DVDs, magneto-optical recording media such as floptical disks, and hardware devices such as ROMs, RAMs and flash memories that are especially configured to store and execute program commands. Examples of the program commands include machine language codes created by a compiler, and high-level language codes that can be executed by a computer using an interpreter. When all or some of a base station or a relay described in the present disclosure is implemented by a computer program, a computer-readable recording medium storing the computer program is also included in the present disclosure. Therefore, the scope of the invention is defined not by the detailed description of the exemplary embodiments but by the appended claims, and the equivalents to the scopes of the claims.

What is claimed is:

1. A terminal in a wireless communication system, the terminal comprising:
   a user interface module configured to display a map including at least one object, wherein each of the at least one object corresponds to each of at least one neighboring device;
   a processor configured to determine a device among the at least one neighboring device based on an input for selecting a displayed object corresponding to the device among the at least one neighboring device; and
   at least one transceiver configured to transmit data to the device,
   wherein a location of each of the at least one object in the map is determined based on a location of each of the at least one neighboring device, and
   wherein the location of each of the at least one object in the map is adjusted in response to a change of a direction of the terminal.

2. The terminal of claim 1, wherein the direction of the terminal is determined based on at least one of a line of sight (LOS) path variation pattern or a measurement beam pattern.

3. The terminal of claim 2, wherein the processor is configured to update the map on a specific time period basis.

4. The terminal of claim 2, wherein the map comprises a radial chart showing a distance and a direction, and location information of the at least one neighboring device displayed on the radial chart.

5. The terminal of claim 4, wherein the user interface module is further configured to display information regarding the selected object, or scale the map and display the scaled map.

6. The terminal of claim 1, wherein the processor is further configured to determine a distance and a direction of the at least one neighbor device with respect to the terminal.

7. The terminal of claim 6, wherein the processor is further configured to control to:
   discover distance information of the at least one neighboring device; and
   discover direction information of the at least one neighboring device.

8. The terminal of claim 7, wherein the processor is further configured to:
   estimate a time taken until a predetermined signal arrives after a signal is transmitted to the at least one neighboring device, and
   measure an intensity of a signal exchanged with the at least one neighboring device in one or more beam directions, and discover the direction information of the at least one neighboring device based on the measured signal intensity.

9. The terminal of claim 1, wherein the at least one transceiver is further configured to:
   transmit a predetermined signal to the at least one neighboring device at a first time, and
   receive a predetermined signal from the at least one neighboring device at a second time.

10. The terminal of claim 9, wherein the processor is further configured to:
    determine a distance of the at least one neighboring device with respect to the terminal based on the difference between the first time and the second time, and
    determine the location of the at least one neighboring device based on the determined distance.

11. A method for operating a terminal in a wireless communication system, the method comprising:
    displaying a map including at least one object, wherein each of the at least one object corresponds to each of at least one neighboring device;
    determining a device among the at least one neighboring device based on an input for selecting a displayed object corresponding to the device among the at least one object; and
    transmitting data to the device,
    wherein a location of each of the at least one object in the map is determined based on a location of each of the at least one neighboring device, and
    wherein the location of each of the at least one object in the map is adjusted in response to a change of a direction of the terminal.

12. The method of claim 11, wherein the direction of the terminal is determined based on at least one of a line of sight (LOS) path variation pattern or a measurement beam pattern.

13. The method of claim 11, further comprising:
    updating the map on a specific time period basis.

14. The method of claim 12, wherein the map information comprises a radial chart showing a distance and a direction, and location information of the at least one neighboring device displayed on the radial chart.

15. The method of claim 14, further comprising displaying information regarding the selected object, or scaling the device map and displaying the scaled device map.

16. The method of claim 11, further comprising:
    determining a distance and a direction of the at least one neighbor device with respect to the terminal.

17. The method of claim 16, wherein the determining of the location comprises:
discovering distance information of the at least one neighboring device; and
discovering direction information of the at least one neighboring device.

18. The method of claim 17,
wherein the distance discovering of the distance information comprises estimating a time taken until a predetermined signal arrives after a signal is transmitted to the at least one neighboring device, and
wherein the discovering of the direction information comprises measuring an intensity of a signal exchanged with the at least one neighboring device in one or more beam directions, and discovering the direction information of the at least one neighboring device based on the measured signal intensity.

19. The method of claim 11, further comprising:
transmitting a predetermined signal to the at least one neighboring device at a first time; and
receiving a predetermined signal from the at least one neighboring device at a second time.

20. The method of claim 19, further comprising:
determining a distance of the at least one neighboring device with respect to the terminal based on the difference between the first time and the second time,
wherein the determining of the location comprises determining the location of the at least one neighboring device based on the determined distance.

21. An apparatus for discovering for a wireless device in a wireless communication system, the apparatus comprising:
a processor configured to:
determine distance information to a neighboring wireless device based on transmission and reception of a predetermined signal,
determine direction information to the neighboring wireless device, and
display a map including at least one object based on the distance information and the direction information,
wherein each of the at least one object corresponds to each of at least one neighboring wireless device,
wherein a location of each of the at least one object in the map is determined based on a location of each of the at least one neighboring device, and
wherein the location of each of the at least one object in the map is adjusted in response to a change of a direction of the terminal.

22. A terminal in a wireless communication system, the terminal comprising:
a user interface module configured to display map information for at least one object based on a location of at least one neighboring device;
a processor configured to determine a device among the at least one neighboring device based on an input for selecting a displayed object corresponding to the device among the at least one neighboring device; and
at least one transceiver configured to transmit data to the device,
wherein the map information comprises a radial chart showing a distance and a direction, and location information of the at least one neighboring device displayed on the radial chart.

* * * * *